United States Patent [19]
Lee et al.

[11] Patent Number: 6,140,456
[45] Date of Patent: Oct. 31, 2000

[54] CHEMICALS AND PROCESSES FOR MAKING FLUORINATED POLY(PARA-XYLYLENES)

[75] Inventors: Chung J. Lee; Hui Wang, both of Fremont; Giovanni Antonio Foggiato, Morgan Hill, all of Calif.

[73] Assignee: Quester Techology, Inc., Fremont, Calif.

[21] Appl. No.: 08/957,792

[22] Filed: Oct. 24, 1997

[51] Int. Cl.$^7$ .......................... C08G 64/00; C08G 63/68; C08G 12/02

[52] U.S. Cl. .......................... 528/196; 528/202; 528/232; 528/244; 528/245; 528/401

[58] Field of Search .............................. 427/255.6, 487; 528/373, 401, 396, 196, 202, 244, 232, 245

[56] References Cited

U.S. PATENT DOCUMENTS

| | | | |
|---|---|---|---|
| 3,268,599 | 8/1966 | Chow et al. | 268/649 |
| 3,342,754 | 9/1967 | Gorham | 260/2 |
| 3,440,277 | 4/1969 | Holland et al. | 528/353 |
| 4,291,244 | 9/1981 | Beach et al. | 307/400 |
| 4,532,369 | 7/1985 | Hartner | 585/428 |
| 5,139,813 | 8/1992 | Yira et al. | 427/8 |
| 5,210,341 | 5/1993 | Dolbier, Jr. et al. | 570/144 |
| 5,268,202 | 12/1993 | You et al. | 427/255.6 |
| 5,324,813 | 6/1994 | Hougham et al. | 528/353 |
| 5,334,454 | 8/1994 | Caporiccio et al. | 428/412 |
| 5,424,097 | 6/1995 | Olson et al. | 427/255.5 |
| 5,534,068 | 7/1996 | Beach et al. | 523/205 |
| 5,536,317 | 7/1996 | Crain et al. | 118/664 |
| 5,536,319 | 7/1996 | Wary et al. | 118/719 |
| 5,536,321 | 7/1996 | Olsen et al. | 118/719 |
| 5,536,322 | 7/1996 | Wary et al. | 118/719 |
| 5,536,892 | 7/1996 | Dolbier, Jr. et al. | 570/144 |
| 5,538,758 | 7/1996 | Beach et al. | 427/255.6 |
| 5,556,473 | 9/1996 | Olson et al. | 118/719 |
| 5,637,395 | 6/1997 | Uemura et al. | 428/343 |
| 5,783,614 | 7/1998 | Chen et al. | 523/205 |

FOREIGN PATENT DOCUMENTS

| | | |
|---|---|---|
| 0 769 788 A2 | 4/1997 | European Pat. Off. . |
| 60-231442 | 11/1985 | Japan . |
| WO 97/14666 | 4/1997 | WIPO . |
| WO 97/15699 | 5/1997 | WIPO . |
| WO 97/15951 | 5/1997 | WIPO . |
| WO 98/24743 | 6/1998 | WIPO . |
| WO 98/41490 | 9/1998 | WIPO . |

OTHER PUBLICATIONS

Jozef Bicerano, *Prediction of Polymer Properties*, Second Edition, Marcel Dekker, Inc., pp. 1–15, 50–61, 108–111, and 280–295.

Kudo, et al., Characteristics of Plasma–CF Films for Very Low–K Dielectrics, Feb. 10–11, 1997, DUMIC Conference, 1997 ISMIC—222D/97/0034, 85–92.

Kogelschatz, Excitation of Excimer Radiation in Silent Discharges, IEEE, 218–227, 1987.

J.I. Krochiwitz, Encyclopedia of Chem. Tech., vol. 5, 320–373, 1991.

Lang, et al., Vapor Deposition of Very Low K Polymer Films, Poly(Naphthalene), Poly(Fluorinated Naphthalene), Mat. Res. Soc. Symp. Proc., vol. 381, 45–50, 1995.

Labelle, et al., Characterization of Pulsed–Plasma Enhanced Chemical Vapor Deposited Fluorocarbon Thin Films, Feb. 10–11, 1997, DUMIC Conference, 1997 ISMIC—222D/97/0034, 98–105.

Lee, Transport Polymerization of Gaseous Intermediates and Polymer Crystals Growth, J. Macromol. Sci.—Rev. Macromol. Chem., C16(1), 79–127, 1977–1978.

Lee, Polyimides, Polyquinolines and Polyquinozalines: $T_g$–Structure Relationships, JMS—Rev. Macromol. Chem. Phys., C29(4), 431–560, 1989.

J.J. McKetta, Encyclopedia of Chem. Proc. & Design, vol. 14, 276–291, 1992.

Meriaudeau, et al., Dehydrocyclization of Alkanes Over Zeolite–Supported Metal Catalysts: Monofunctional or Bifunctional Route, Catal. Rev. Sci. Eng., 39 (1&2), 5–48, 1997.

Selbrede, et al., Characterization of Parylene–N Thin Films for Low Dielectric Constant VLSI Applications, Feb. 10–11, 1997, DUMIC Conference, 1997 ISMIC—222D/97/0034, 121–124.

Sharangpani, et al., Advantages of Chemical Vapor Deposition Over Conventional Techniques for the Processing of Amorphous Teflon Fluoropolymer, Feb. 10–11, 1997, DUMIC Conference, 1997 ISMIC—222D/97/0034, 117–120.

Wang, et al., Parylene–N Thermal Stability Increase by Oxygen Reduction–Low Substrate Temperature Deposition, Preannealing, and PETEOS Encapsulation, Feb. 10–11, 1997, DUMIC Conference, 1997 ISMIC—222D/97/0034, 125–128.

Wary, et al., Vacuum–Deposited Parylene AF–4: A Thermally Stable, Low Dielectric Constant Polymer for Interlayer Dielectric Use, Semi–Conductor International, 211–216, Jun. 1996.

*Primary Examiner*—Paul Thibodeau
*Assistant Examiner*—Holly C Rickman
*Attorney, Agent, or Firm*—Fliesler, Dubb, Meyer & Lovejoy

[57] ABSTRACT

New starting materials and chemical processes will be used to make fluorinated poly(para-xylylenes) (F-PPX) and fluorinated poly(para-fluoroxylylenes) (F-PPFX). The processes will use some very low cost and readily available starting materials, catalysts, chemical reactors, transport polymerization (TP) systems, and chemical vapor deposition (CVD) systems commonly used for making F-PPX. New TP and CVD deposition systems will also be used to make F-PPX and F-PPFX. These polymers are used for the manufacture of low dielectric films with high thermal stability and are sufficiently strong to withstand planarization and polishing for the manufacture of integrated circuits.

32 Claims, 9 Drawing Sheets

FIG.—4

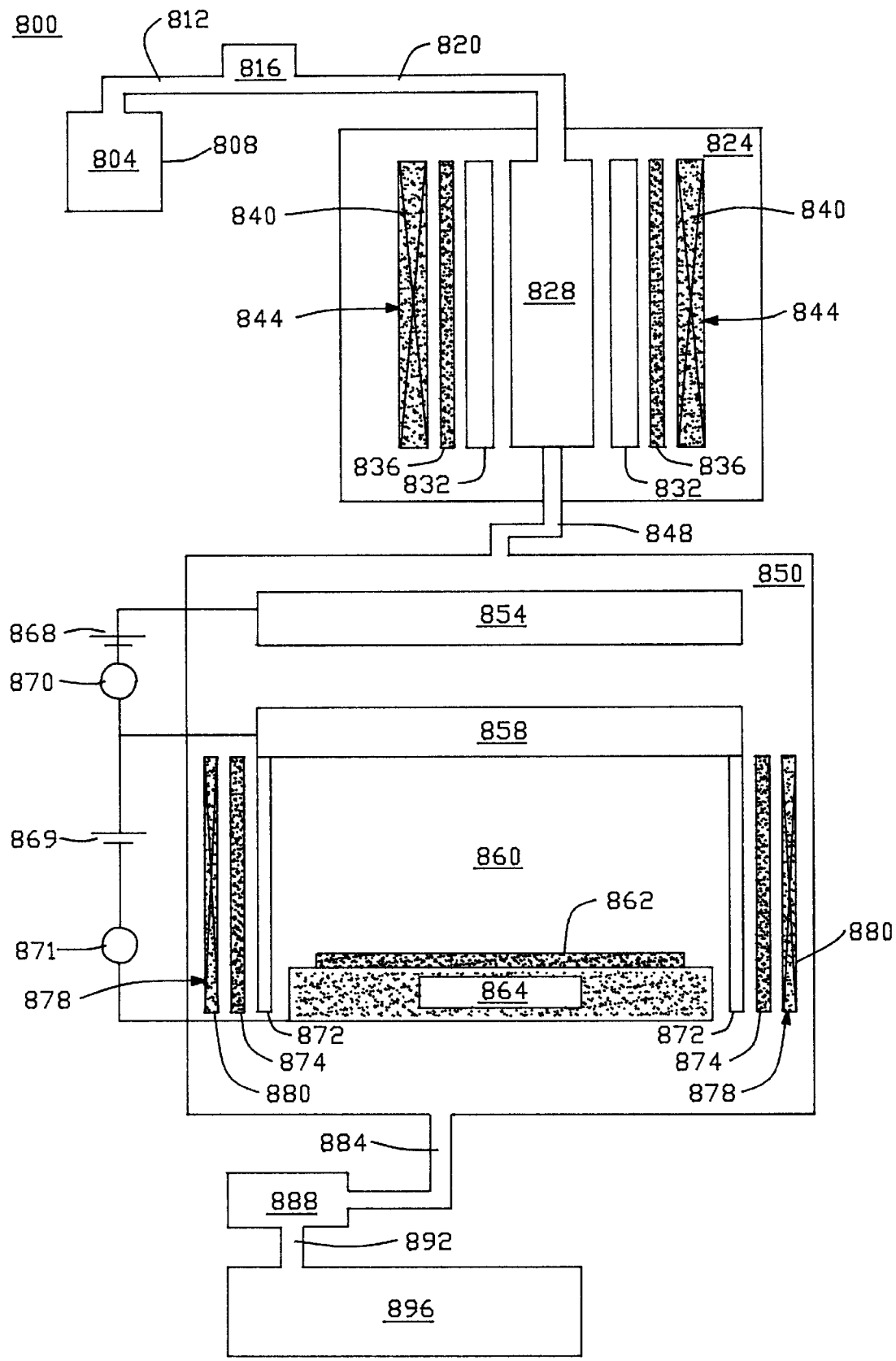
FIG.—8

CHEMICALS AND PROCESSES FOR MAKING FLUORINATED POLY(PARA-XYLYLENES)

CROSS REFERENCE

Lee et al., Precursors for Making Low Dielectric Constant Materials with Improved Thermal Stability. Ser. No. 08/957,481, now U.S. Pat. No. 6,020,458.

Lee et al., New Deposition Systems and Processes for Transport Polymerization and Chemical Vapor Decomposition. Ser. No. 08/958,352, now U.S. Pat. No. 6,086,679.

Lee et al., Low Dielectric Constant Materials with Improved Thermal and Mechanical Properties. Ser. No. 08/958,057, pending.

Lee et al., Low Dielectric Constant Materials Prepared from Photon and Plasma Assisted Chemical Vapor Deposition and Transport Polymerization of Selected Compounds. Ser. No. 08/957,480, now U.S. Pat. No. 6,051,321.

All of the co-pending applications are herein incorporated fully by reference.

FIELD OF THE INVENTION

This invention is related to new chemical compositions, processes for preparation of fluorinated poly(para-xylylenes) (F-PPX), cross-linked F-PPX, poly(para-fluoroxylylenes) (PPFX), fluorinated poly(para-fluoroxylylenes) (F-PPFX), cross-linked PPFX, cross-linked F-PPFX, and integrated circuit chips employing these compositions.

BACKGROUND OF THE INVENTION

For the past 20 years, the integrated circuit (IC) device density has doubled about every 18 months. When the gate length of integrated circuits is less than 0.18 $\mu$m, the propagation time or delay time is dominated by interconnect delay instead of device gate delay. To address this problem, new materials with low dielectric constants (K) are being developed. The aim of this development is to decrease time constant (RC delay), decrease power consumption, and decrease cross-talk in integrated circuits. There are two groups of low K dielectric materials, the traditional inorganic group exemplified by $SiO_2$, and newer organic polymers, exemplified by poly(para-xylylene). Organic polymers are considered an improvement over inorganic low dielectric materials because the K of organic polymers can be as low as 2.0. However, most of these organic polymers have serious problems. Specifically, they have insufficient thermal stability, and are difficult and expensive to manufacture in a vacuum system.

For IC features of 0.35 $\mu$m, current production lines use materials consisting primarily of $SiO_2$. The $SiO_2$ products have dielectric constants ranging from 4.0 to 4.5. In addition, stable fluorinated $SiO_2$ materials with a dielectric constant of 3.5 have been achieved. These $SiO_2$-containing materials are primarily obtained from plasma enhanced chemical vapor deposition (PECVD), photon assisted chemical vapor deposition (PACVD), and high density plasma chemical vapor deposition (HDPCVD) of various siloxane containing compounds such as trimethylsiloxane (TMS), tetraethylorthosilicate (TEOS) and silazanes in conjunction with $SiF_4$, $C_2F_4$.

I. Precursors and Polymers

Several thermally stable polymers or polymer precursors are under study. These include polyimides (PIM), fluorinated polyimides (F-PIM), polyquinoxalines (PQXL), benzocyclobutenes (BCB), fluorinated polyphenylethers (F-PPE), and several types of silsesquisiloxanes. These polymers have dielectric constants ranging from 2.6 to 3.0. Solutions of these polymers or their precursors are used in spin coating processes to achieve gap filling and planarization over metal features. However, the dielectric constants of these polymers is too high for the future ICs with small feature sizes. In addition, all thermally stable polymers including PIM and PQXL have a persistent chain length (PCL; or the loop length of a naturally curling up polymer chain) up to several hundred or thousands of Å. Long PCL makes complete gap filling very difficult if not physically impossible.

Recently, another type of low dielectric material, poly(para-xylylene) (PPX) has been studied and evaluated for future IC fabrication. These PPX include Parylene™-N, Parylene™-C & Parylene™-D (trademarks of Special Coating System Inc.'s poly(para-xylylenes)). Currently, all commercial available poly(para-xylylenes) are prepared from dimers. The currently available starting materials or dimers for manufacturing poly(para-xylylenes) are expensive (>$500 to $700/kg). Unfortunately, these poly(para-xylylenes) have high dielectric constants (K=2.7–3.5) and low thermal stability (decomposition temperature, Td<320° C.–350° C. in vacuum), and thus are not suitable for IC fabrication.

The fluorinated poly(para-xylylene) (F-PPX) or Parylene AF-4™, for example, has the structure of $(-CF_2-C_6H_4-CF_2-)_n$. It has a dielectric constant of 2.34 and is thermally stable (0.8%/hr. wt. loss at 450° C. over 3 hours in nitrogen atmosphere).

II. Processes for Manufacturing Polymers

Currently, fluorinated poly(para-xylylenes) are polymerized from F-dimers by the method of Gorham, (*J. Polymer Sci. A*1(4):3027 (1966)) as depicted in Reaction 1 below:

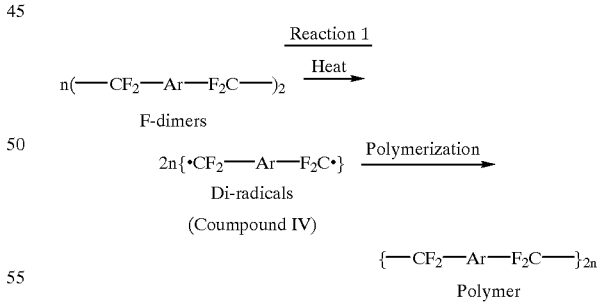

In this reaction, Ar is $-C_6H_4-$. However, the precursor molecule and the F-dimer needed for the manufacture of Parylene AF-4™ is expensive and time-consuming to make because several chemical reaction steps are needed to make its fluorinated dimer.

F-dimers are manufactured according to the following series of chemical steps:

Step 1:

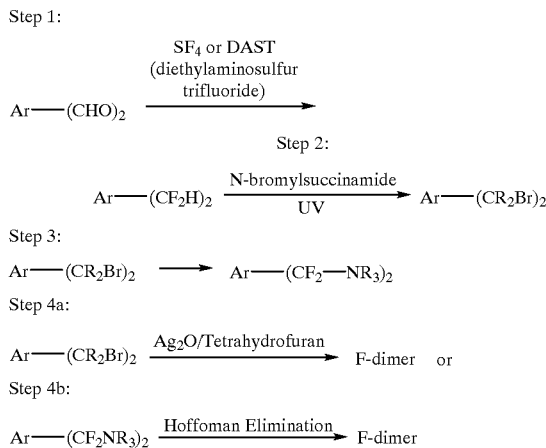

The overall yields for making F-dimers was low (estimated from 12% to 20% based on the weight of its starting material). In addition, the last step of the syntheses of the precursor, or the dimerization step (4a or 4b), can only be effectively carried out in very dilute solutions (from 2% to less than 10% weight/volume resulting in low conversion efficiency). Further, the needed lead time and material cost for making F-containing dimers is very high. For instance, 10 g of the F-dimer can cost as much as $2,000/g. The lead time is 2–3 months for getting 1 kg of sample from current pilot plant production facilities.

Therefore, even though fluorinated poly(para-xylylenes) might be suitable as dielectric materials in "embedded" IC structures, it is very unlikely that the F-dimer will ever be produced in large enough quantity for cost effective applications in future IC fabrication.

On the other hand, a readily available di-aldehyde starting material (Compound Ia) is reacted with sulfurtetrafluoride at elevated pressure of 1 MPa to 20 MPa and temperatures of 140° C. to 200° C. to yield the tetrafluorinated precursor (Compound IIIa) and sulfur dioxide (Reaction 2). The sulfur dioxide is then exhausted from the reaction chamber. Alternatively, the di-aldehyde can be reacted with diethylaminosulfur trifluoride (DAST) at 25° C. at atmospheric pressure to make the Compound IIIa.

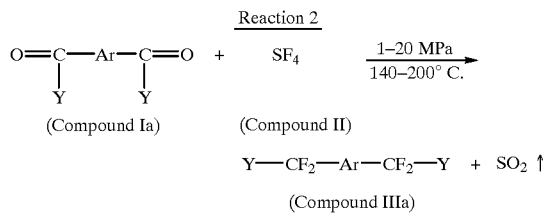

Y is a leaving group, and both Compound Ia and Compound IIIa have a non-fluorinated aromatic moiety (Ar). The Compound IIIa in solution can be converted into a dibromo Compound IIIb through a photo-reaction (Hasek et al., *J. Am. Chem. Soc.* 82:543 (1960). The dibromo Compound IIIb was used by Lu, et al., U.S. Pat. No. 5,268,202 to generate diradicals (Compound IV) that was transported under low pressure to a deposition chamber to make thin films of fluorinated poly(para-xylylenes).

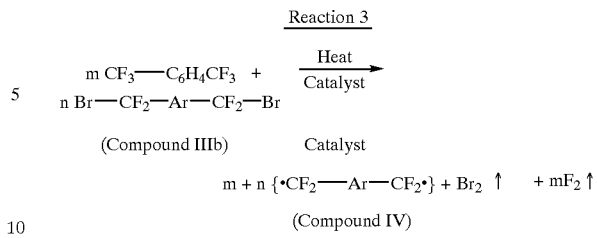

Additionally, poly(para-xylylene)-N (PPX-N) was also prepared directly from pyrolysis of p-xylene. (Errede and Szarwe, *Quarterly Rev. Chem. Soc.* 12:301 (1958); Reaction 4).

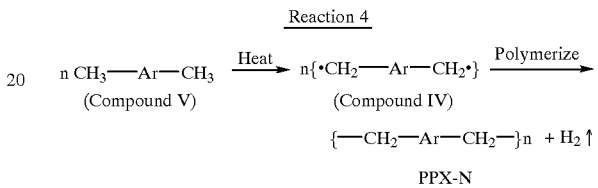

III. Deposition of Polymer Films

The deposition of low dielectric materials onto wafer surfaces has been performed using spin on glass (SOG), but for newer devices which have features smaller than 0.25 μm, SOG processes cannot fill the small gaps between features. Therefore, vapor deposition methods are preferred. Of these, transport polymerization (TP) and chemical vapor deposition (CVD) are most suitable.

In both TP and CVD, the precursor molecule is split (cracked) to yield a reactive radical intermediate. The reactive intermediate contains at least one unpaired electron which upon deposition onto the wafer can bind with other reactive intermediate molecules to form a polymer. The polymer thus forms a thin film of material with a low dielectric constant.

Chemical vapor deposition has been used to deposit thin films with low dielectric constant. Sharangpani and Singh, *Proc. 3d Int. DUMIC Conference,* 117–120 (1997) reported deposition of amorphous poly(tetrafluoroethylene) (PFTE; Teflon™, a registered trade name of DuPont, Inc.) by a direct liquid injection system. A solution of PFTE is sprayed on a wafer substrate, which is exposed to ultraviolet light and light from tungsten halogen lamps. Unfortunately, PFTE has a low glass transition temperature (Tg) and cannot be used for IC fabrication requiring temperatures of greater than 400° C.

Labelle et al., *Proc. 3d Int. DUMIC Conference,* 98–105 (1997) reported using pulsed radio frequency (RF) plasma enhanced CVD (PECVD) process for deposition of hexafluoropropylene oxide. However, as with poly (tetrafluoroethylene), the resulting polymers have low Tg values and cannot be used as dielectrics.

Kudo et al., *Proc. 3d Int. DUMIC Conference,* 85–92 (1997) reported using a PECVD process for deposition of hydrocarbons including $C_2H_2/(C_2H_2+C_4F_4)$.

Lang et al., *Mat. Res. Soc. Symp. Proc.* 381:45–50 (1995) reported thermal CVD process for deposition of poly (naphthalene) and poly(fluorinated Naphthalene). Although polymers made from these materials have low dielectric constants, the polymers are very rigid, being composed of adjoining naphthalene moieties. Thus, they are prone to shattering with subsequent processing such as CMP.

Selbrede and Zucker, *Proc. 3d Int. DUMIC Conference,* 121–124 (1997) reported using a thermal TP process for deposition of Parylene-N™. The dielectric constant of the resulting polymer (K=2.65–2.70) also was not low enough. For future IC applications, the decomposition temperature (Td) of the thin film was also too low to withstand temperatures greater than 400° C.

Wang et al., *Proc. 3d Int. DUMIC Conference,* 125–128 (1997) reported that annealing a deposited layer of poly (para-xylylene) increases the thermal stability, but even then, the loss of polymer was too great to be useful for future IC manufacturing.

Wary et al. (*Semiconductor International,* June 1996, pp: 211–216) used the precursor ( , , ', ', tetrafluoro-di-p-xylylene) and a thermal TP process for making polymers of the structural formula: $\{-CF_2-C_6H_4-CF_2-\}_n$. Films made from Parylene AF-4™ have dielectric constant of 2.28 and have increased thermal stability compared to the hydrocarbon dielectric materials mentioned above. Under nitrogen atmosphere, a polymer made of Parylene AF-4™ lost only 0.8% of its weight over 3 hours at 450° C.

In contrast to a CVD process, transport polymerization (TP) (Lee, C. J., Transport Polymerization of Gaseous Intermediates and Polymer crystal Growth." *J. Macromol. Sci. -Rev. Macromol. Chem.* C16:79–127 (1977–1978), avoids several problems by cracking the precursor in one chamber and then transporting the intermediate molecules into a different deposition chamber. By doing this, the wafer can be kept cool, so that metal lines are not disrupted, and multiple layers of semiconductor devices may be manufactured on the same wafer. Further, the conditions of cracking can be adjusted to maximize the cracking of the precursor, ensuring that very little or no precursor is transported to the deposition chamber. Moreover, the density of the transported intermediates may be kept low, to discourage re-dimerization of intermediates. Thus, the thin film of low dielectric material is more homogeneous and more highly polymerized than films deposited by CVD. Therefore, these films have higher mechanical strength and can be processed with greater precision, leading to more reproducible.

SUMMARY OF THE INVENTION

The present invention is directed to overcoming the disadvantages of the prior art.

Accordingly, an object of the present invention is to provide a precursor for making poly(para-xylylenes) with low dielectric constants.

A further objective is to provide a precursor for making fluorinated poly(para-xylylenes) which have improved thermal stability.

A yet further objective is to provide a precursor for making fluorinated poly(para-xylylenes) which have high elastic modulus.

An additional objective is to provide a precursor for making fluorinated poly(para-xylylenes) which have high shear modulus.

A yet additional objective is to provide a precursor for making fluorinated poly(para-xylylenes) which have high glass transition temperature.

Another objective is to provide a precursor for making poly(para-xylylenes) which can be manufactured from inexpensive starting materials.

A yet further objective is to provide a precursor for making poly(para-xylylenes) which can be manufactured with high efficiency.

A additional objective is to provide a precursor for making poly(para-xylylenes) that produce low amounts of environmental toxins.

The invention includes novel precursors for making fluorinated poly(para-xylylenes) from aromatic di-aldehydes.

The invention also includes methods for making polymers made from the precursors of the invention.

The invention also includes polymer thin films deposited on substrates.

The invention further includes integrated circuits made from polymers of the invention.

Accordingly, one aspect of the invention comprises a starting material for making fluorinated poly(para-xylylenes) comprising an aromatic di-aldehyde, wherein the resulting polymer has a low dielectric constant.

Another aspect of the invention comprises a precursor for making fluorinated poly(para-xylylenes) which can be manufactured into a polymer with a high thermal stability.

Yet another aspect of the invention comprises a precursor which can be manufactured into a polymer with sufficiently high mechanical strength to be processed during the manufacture of integrated circuits.

Another aspect of the invention comprises a precursor containing fluorinated phenylene moieties.

Yet another aspect of the invention comprises methods for making polymers for integrated circuit manufacture using novel fluorinated precursors.

A yet another aspect of the invention includes thin films made from polymers manufactured using the precursors and methods.

This invention offers products with low dielectric constants and good thermal stability for use as intermetal dielectrics (IMD) and interlevel dielectrics (ILD) for the manufacture of integrated circuits. The compositions are derived from chemicals with lower cost than currently available chemicals. The processes provide more energy efficiency than conventional methods.

Other objects, aspects and advantages of the invention can be ascertained from the review of the additional detailed disclosure, the examples, the figures and the claims.

BRIEF DESCRIPTION OF THE FIGURES

FIG. 8 depicts an embodiment of the invention for photon-plasma assisted transport polymerization of poly (para-xylylenes).

FIG. 9 depicts an embodiment of a semiconductor wafer of the invention with a thin film dielectric layer and imbedded integrated circuit features.

DETAILED DESCRIPTION OF THE PREFERRED EMBODIMENT

Figure 1:
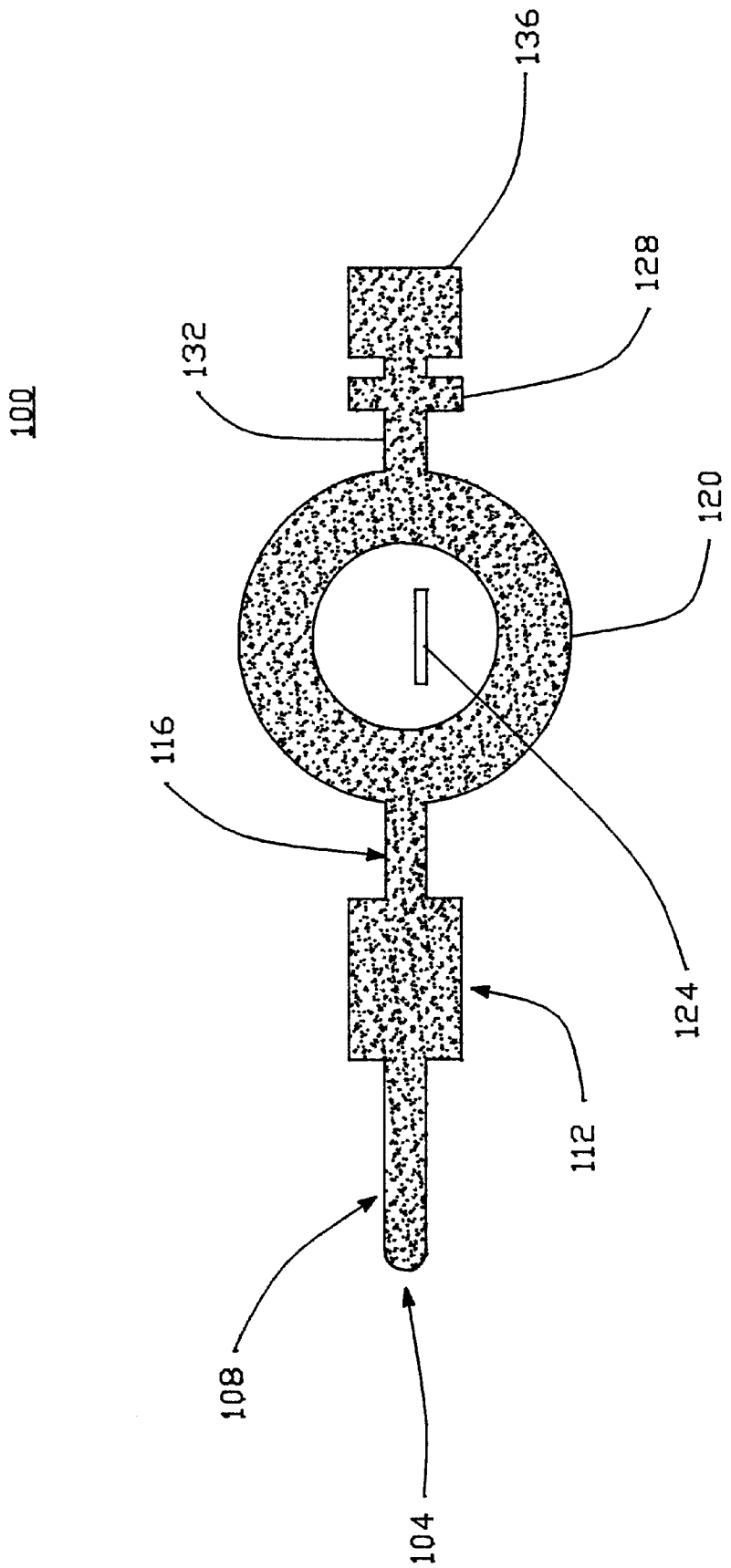
FIG. 1 depicts prior art equipment for transport polymerization of poly(para-xylylenes).

I. Starting Materials and Generation of Precursors of Poly(Para-Xylylenes)

This invention represents novel precursors and improvements in the ways in which poly(para-xylylenes) are made for integrated circuit manufacture. As used herein, the term poly(para-xylylene) generally includes fluorinated derivatives of poly(para-xylylene). Specific derivatives are discussed individually. Reaction 5 below describes the preparation of a tetrafluoro precursor compound from sulfur tetrafluoride and a starting material:

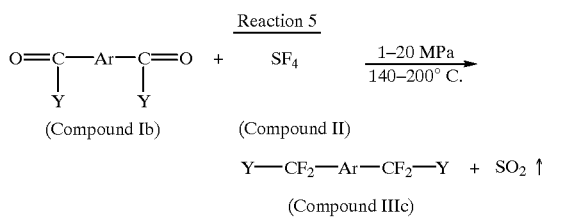

Compounds Ib and IIIc contain aromatic moieties containing at least one fluorine atom. In the above, Y is a leaving group preferably comprising —H. Alternatively, other precursors (Compound IIIc), where Y is —SR, —NR$_3$, —SO$_2$R, —OR, —CR$_3$, wherein R groups are an allyl or aromatic groups, can be prepared from the brominated derivatives of its tetrafluoro Compound IIIa (where Y=H). Chow et al., *Jour. Org. Chem.* 35(1):20–21 (1970); Chow et al., U.S. Pat. No. 3,268,599; Hartner, U.S. Pat. No. 4,532,369. These references are incorporated herein fully by reference. These precursors have lower C—Y bonding energy than C—F bonds, thus providing lower processing temperatures when thermolytic methods are employed. For manufacturing linear, weakly-cross-linked polymers, preferred Y groups are —NR$_3$ and —SR. For manufacturing more highly cross-linked polymers, the preferred Y group is —H. The Ar is an aromatic radical consisting of 6 carbon atoms, preferably a F-containing aromatic radical comprising sp$^2$C—F bonding. sp$^2$C— refers to a bond type in which a carbon atom is connected to other elements with at least one double bond such as C=C. sp$^3$C— refers to a bond type in which a carbon atom is connected to other elements with single bonds such as those in C—F$_4$.

The invention comprises a (1) direct method for generation of the di-radicals (Compound IV) from the tetrafluoro Compound IIIc, (2) new precursors containing a fluorinated aromatic moiety, and (3) newly designed equipment to facilitate the reactions for IC fabrication. Further description of the equipment used is found in the above-identified co-pending application titled "New Deposition Systems & Processes for Transport Polymerization", incorporated herein fully by reference.

New precursors of this invention comprise fluorinated xylylenes, which are polymerized into fluorinated poly(para-fluoroxylylenes); (F-PPFX) have the chemical formula: H$_{2-m}$F$_m$C—C$_6$H$_{4-n}$F$_n$—CF$_p$H$_{2-p}$, wherein n is an integer of 1, 2, 3, or 4, and m and p are integers of 0, 1, or 2. The polymers are generally termed poly(para-fluoroxylylenes), or PPFX, and include poly(para- -monofluoroxylylene), poly(para- , '-difluoroxylylene), poly(para- , ', "-trifluoroxylylene), and poly(para- , ', ", '"-tetrafluoroxylylene). There are several possible isomers of the mono-, di- and tri-fluorinated xylylenes, and all are considered to be part of this invention.

Poly(para-monofluoroxylylene) has a ratio of the sp$^2$C—F to sp$^3$C—F bonds in the phenyl moiety of 0.25. Preferably, the phenylene ring is more highly fluorinated, and most preferably, the phenylene moiety is fully fluorinated. Polymers with higher sp$^2$C—F to sp$^3$C—F bond ratios will have higher thermal stability and lower dielectric constant. High thermal stability is an important requirement for meeting metal processing conditions during IC fabrication.

The reaction used for the cracking of the precursors of the invention are described in Reaction 6:

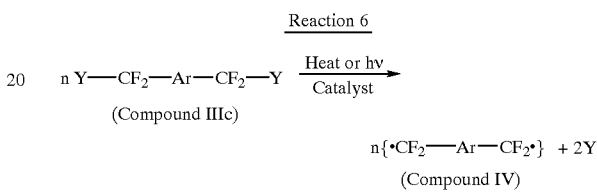

In general, Compound IIIc can be prepared from its corresponding dialdehyde using SF$_4$ or DAST as fluorinating agents (see above Reaction 1).

The above tetrafluoro precursor Compound IIIc is fed into a transport polymerization system (FIGS. 1–7) where it is dissociated (cracked) using an energy source such as heat, plasma or photons, and is then transported into a deposition chamber and is finally deposited onto the surface of a wafer where the di-radical intermediates (Compound IV) polymerize into a thin film of fluorinated poly(para-fluoroxylylene) material with a low dielectric constant.

The above precursor can also be used in a chemical vapor deposition (CVD) system. There, the precursor is placed directly on the wafer, which is then exposed to heat or light energy which cracks the precursor into intermediates (Compound IV), which then polymerize into a thin film.

These precursors (Compound IIIc) offer several advantages over the prior art. First, the monomeric compound (IIIc) where Y=H is cheaper and more readily available than the dimer, (—CF$_2$—Ar—CF$_2$—)$_2$ or the di-bromo compound (IIIb). Next, the inclusion of fluorine atoms in the aromatic moiety confers greater thermal stability and mechanical strength and decreases the dielectric constant of the resulting polymer. Moreover, precursors which can form cross-linked polymers confer greater strength to the polymer One theory for the increased thermal stability of poly (para-xylylenes) is that the bonding energies of the sp$^2$C=sp$^2$C, sp$^2$C—F and sp$^2$C—sp$^3$C bonds of 145, 126, and 102 kcal/mol. respectively, are higher than that of sp$^3$C—H bonds (88 kcal/mol). A possible additional theory is that the sp$^3$C—F bonds may also be involved in hyperconjugation with sp$^2$C=sp$^2$C double bonds of the adjacent phenylene groups in the fluorinated poly(para-xylylene). This hyperconjugation renders a higher bond energy for the sp$^3$C—F bonds than that found in non-hyperconjugated sp$^3$C—F bonds.

Furthermore, brominated precursors generate molecular bromine, an environmentally unfriendly product. Replacement of Br by H results in the production of molecular hydrogen, which is environmentally friendly or can be burned easily and safely.

This invention can also offer higher yields because the side product, molecular hydrogen, has a lower atomic weight than bromine.

II. Transport Polymerization and Chemical Vapor Deposition of Poly(Para-Xylylenes)

Transport Polymerization (TP) and Chemical Vapor Deposition (CVD) of materials generally involves a multi-step process, wherein a precursor is cracked to form a reactive intermediate, and the reactive intermediates then can polymerize.

Transport polymerization begins with the cleavage of precursors to form reactive intermediates in one chamber. The reactive intermediates are then transported into a different chamber or to a different location in the same chamber for deposition on a substrate (usually silicon or silicon dioxide with metal features). In contrast, CVD processes occur in a single chamber wherein the dissociation of precursor and polymerization of polymer occur directly on the wafer. CVD is generally described in P. Van Zant, *Microchip Fabrication, A Practical Guide To Semiconductor Processing*, 3d edition, McGraw Hill, San Francisco (1997), incorporated herein fully by reference.

There are several types of TP and CVD which are defined by the energy sources used to crack the precursors. Thermal TP or CVD use heat energy, usually derived from a resistive heater. Infrared TP and CVD use IR radiation to heat the precursors. Photon assisted TP and CVD utilize the principal that light energy of certain wavelengths can break inter-atomic bonds resulting in the formation of the reactive intermediate radicals. Plasma enhanced TP and CVD utilizes plasma energy, derived from an electrical field or from microwaves. High density plasma TP and CVD (HDPTP and HDPCVD) also use energy derived from radiofrequency generators. The types of TP and CVD processes useful for practicing the present invention are shown in Table 1.

TABLE 1

Methods Used for Depositing Precursors of Poly(Para-Xylylenes)

| | Thermal | Photon Assisted | Plasma Enhanced |
|---|---|---|---|
| TP | ** | ** | * |
| CVD | Impossible | Possible | ** |

Table 1 shows the preferred (**) methods for depositing precursors of this invention. Thermal CVD is currently impossible because the high temperatures needed to crack the precursor damage the aluminum metal lines and polymers on the wafers. Photon assisted CVD is possible, as is plasma enhanced transport polymerization (*). The methods and equipment are described below and in the co-pending applications.

A. Transport Polymerization of Poly(Para-Xylylenes) Using Thermal Methods

All current commercial poly(para-xylylenes) are prepared from thermolysis of its corresponding dimers (2,2 paracyclophanes) using the Gorham method. The dimers are cleaved in a furnace operated at temperatures ranging from 600° C. to 800° C. to generate the needed reactive intermediates or di-radicals. Similarly, thermolytic or photolytic methods can be used to make polymers using the precursors of this invention. The thermolytic and photolytic processes generate reactive intermediates by breaking the C—Y bonds in the precursor, Compound IIIc. Because the C—F bonding energy is stronger than that of the C—Y bond, in principle, thermolysis for this reaction can be very effective at splitting the C—Y bonds, and can generate fluorinated di-radicals necessary for polymerization of the intermediates into fluorinated polymers. Thermal processing can be achieved using a transport polymerization system (FIG. 1) which is prior art, or by using new transport polymerization systems (FIGS. 2–7), which are new and novel.

FIG. 1 shows a general diagram of a prior art transport polymerization system 100 using solid dimers. A door 104 permits the placement of precursors into the vaporizer 108. The vaporized precursors are transported to the pyrolyzer 112, where the precursors are thermally cleaved into reactive intermediates. The intermediates are then transported via a pipe 116 to the chamber 120 and chuck 124, where the intermediates polymerize on the wafer surface. A valve 132 permits the chamber pressure to be lowered by a dry pump 136 keeps the pressure of the system low, and the cold trap and mechanical chiller 128 protects the pump from the unpolymerized molecules in the chamber.

Figure 2:
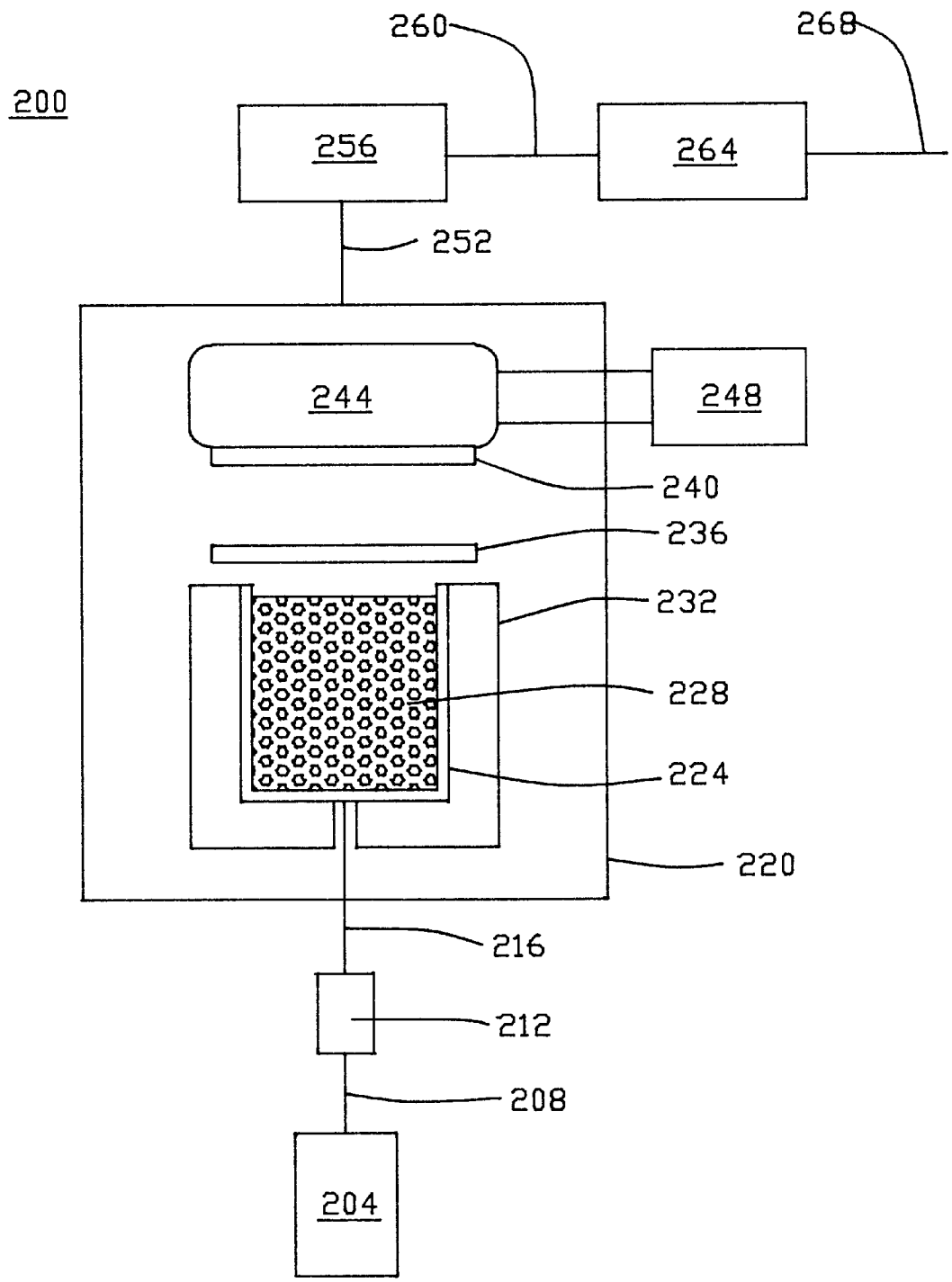
FIG. 2 depicts an embodiment of the invention having a single chamber used for thermolytic transport polymerization (TTP) of poly(para-xylylenes).

FIG. 2 shows a more specific schematic diagram of a novel transport polymerization system 200 using a resistive heater. The liquid precursors are contained within a precursor tank 204, flow through a pipe 208 into a mass flow controller 212, are controllably released through another pipe 216 and into the chamber 220. The chamber includes a container (cracking device) 224 which can be adapted to hold a catalyst 228 which will be described below. The precursor molecules are transported into the cracking device and are heated by a resistive heater 232 to generate the reactive intermediates. After leaving the cracking device, the intermediates are dispersed by a diffusion plate 236 to disperse the intermediates evenly over the wafer surface 240.

The intermediates deposit upon the wafer 240, which is held on a cold chuck 244 which in turn, is connected to a chiller 248 to maintain a temperature of the chuck and wafer below the condensation temperature of the intermediates. The pressure in the chamber 220 is reduced by a pump 264 connected via a pipe 260 to a trap 256, which is connected to the chamber 220. The trap 256 prevents molecules from depositing inside the pump 264.

Pyrolysis of novel precursors of this invention results in reactive intermediates comprising mostly di-radicals. These intermediates are then transported to a deposition chamber (FIG. 1). The chamber wall is kept at temperatures ranging from 60° C. to 150° C. to prevent deposition on the chamber wall. Deposition of thin polymer films will be largely confined to the wafer as long as the wafer is maintained at relatively low temperatures. A cold chuck therefore is used to hold the wafer and maintain the desired wafer temperatures. The range of temperatures is from about −40° C. to about 30° C. The ceiling temperature that an intermediate will condense on the wafer surface depends upon its chemical structure and the degree of vacuum. For tetrafluorobenzene di-radicals, the ceiling temperature ranges from about 30° C. to about 50° C. when the chamber pressure is in the range of from about 20 milliTorr to 100 milliTorr. The wafer deposition temperature determines not only the deposition rate, but also the mechanical properties of the resulting polymer. For example, PPX-N deposited at lower temperatures (below −20° C. to −30° C.) have lower elastic modulus and higher elongation at break, due to lower crystallinity compared to PPX-N deposited at higher temperatures.

Depending on the temperatures and pressure in the pyrolyzer, thin films consisting primarily of either linear or highly cross-linked fluorinated polymers can be obtained. For instance, under higher pyrolyzer temperatures (>750° C.), cross-linked F-PPX tends to result from cracking of C—F bonds of the Compound IIIc. To generate cross-linked polymers, wherein H is a leaving group, it is necessary to select conditions favoring elimination of H and some of the F atoms, thereby creating multi-radical intermediates. For precursors in which the leaving group Y is H, and when catalysts are not used, temperatures of about 700° C. to about 800° C. are desirable. When catalysts are used, temperatures can be as low as about 400° C. When Y is Br or $SiR_3$, the ideal temperatures are from 500° C. to 750° C. Upon deposition on the wafer, these multi-radical intermediates form cross-links with adjacent polymer chains, thereby increasing the mechanical strength and thermal stability of the resulting polymer film.

Alternatively, to generate more linear polymers, the use of —SR and —$NR_3$ as leaving groups is preferred because their bonds can be selectively broken at different temperatures. At low pyrolysis temperatures (<700° C.), the SR and $NR_3$ groups will be eliminated, resulting in intermediates which deposit and form mostly linear polymers. When Y is SR, or $SO_2R$, temperatures in the range of 450° C. to 700° C. are desirable. At higher temperatures (>750° C. to about 800° C.), F atoms can be eliminated also, forming multi-radical intermediates. As with those formed from H-containing precursors, the multi-radical intermediates can deposit to form polymers which are cross-linked.

The time needed to complete the pyrolysis ranges from a few milliseconds to several hundred milliseconds.

1. Catalysts

The temperatures and times needed to complete pyrolysis can be reduced by employing a catalyst in the chamber. There are three types of catalysts useful for this invention. They include dehydrogenation catalysts, debromination catalysts, and desulfurization catalysts. The type of catalyst used is dependent upon the leaving group of the precursor.

An ideal catalyst useful for this invention should provide high reactivity, high selectivity, long process life cycle, high recycle capability, and less severe pressure and temperature requirements. It should be inexpensive, safe for human handling, and should be environmentally friendly. The catalyst should crack or cleave the C—Y bond without cracking or cleaving the C—F bonds, if linear polymers are desired. Further, the catalyst should not add any metal or metal compound into the dielectric film during deposition. Serious reliability problems occur when a metal contaminant resides within the dielectric materials.

a. Dehydrogenation Catalysts

When Y is —H, any commonly used dehydrogenation catalyst is suitable. These catalysts are also called "protolytic cracking catalysts", or "oxidative dehydrogenation catalysts", in petroleum processing. Additionally, most "dehydrocyclization catalysts" and some of the "aromatization catalysts" for hydrocarbon processing are also useful for this invention, because aromatization normally involves dehydrogenation.

Potassium ferrite ($KFeO_2$) on iron oxide is an example of a suitable catalyst which is commercially available. The ferrite commonly comprises a promoter that may contain a salt of oxide of a Group (IIA) metal, such as Mg, Ca, or Sr, and a Group VB or VIB metal, such as V, Nb, Cr, Mo. or W. [See J. I. Krochiwitz ed., *Encyclopedia of Chemical Technology*, 4th edition, Catalysis and Catalysts, Vol. 5: 320 (1991), incorporated herein fully by reference.] These catalysts can be useful at temperatures up to about 600° C. Variations of these catalysts are BASF's Lu-144F™ and Shell 105™ catalysts, and catalysts for the dehydrogenation of ethylbenzene. These include those produced by Monsanto-Combustion Engineering-Lumis, Union Carbide-Cosden-Badger, and Societe-Chimique des Charbonnages. [See J. J. McKetta, Ed., *Encyclopedia of Chemical Processing and Designs: Dehydrogenation*, Vol. 14:276, Marcel Dekker Inc. (1992), incorporated herein fully by reference.]

Other industrial catalysts include Cu and Zn oxides on alumina and Cu, Ag or Cu-Ag alloy in the form of gauge or as metal deposited on a low surface area support such as kaolin, clay and active carbon. Other supports or carriers can include asbestos, pumice, kiesselguhr, bauxite, CuO, $Cr_2O$, $MgCO_3$, $ZrO_2$, and zeolites. These catalysts are active by virtue of an oxide layer on the metals, and are used for hydrogen generation from methanol. Catalysts consist of copper chromite, bismuth molybdate, iron molybdate, or tin phosphate on similar supports are also useful. [See J. I. Krochiwitz ed., *Encyclopedia of Chemical Technology*, 4th edition, Catalysis and Catalysts, Vol. 5: 320 (1991); J. J. McKetta, Ed., *Encyclopedia of Chemical Processing and Designs: Dehydrogenation*, Vol. 14:276, Marcel Dekker Inc. (1992). Both of these references are incorporated herein fully by reference.]

In addition to dehydrogenation catalysts, reforming catalysts used in petroleum reforming processes can also be used. A first group of these include transition metal oxides, such as $V_2O_5$, $MoO_3$, $WO_3$ and $Cr_2O_3$ in bulk form or preferred on a non-acid support such as silica, neutral alumina or active carbon. [See Meriaudeau and Naccache, *Cat. Rev. -Eng. Sci.* 39(1&2):5–48 (1997), incorporated herein fully by reference. Typically useful catalysts include Shell 205™, which consists of 62.5% $Fe_2O_3$, 2.2% $Cr_2O_3$, and 35.3% $K_2CO_3$, and Dow Type B™ catalyst, which consists of calcium and nickel phosphates promoted with a small amount of chromium oxide.

An additional group of catalysts useful for dehydrogenation include noble metals on acid supports. The most commonly used catalysts are Pt (0.3 to 0.7%) and Pt/Re on a chlorided (acidified) alumina (e.g., γ- or η-$Al_2O_3$). The bimetallic Pt/Re-alumina is preferred for its longer life time. In addition, Pt, Ga or An modified H-ZSM-5™, or Pt on medium-pore zeolite support such as In-ZSM-5™ is also very effective.

Other, multimetallic reforming catalysts include Pt/Re catalysts of the above including lesser amounts of Ir, Ga, Ge, Sn or Pb supported by chlorided alumina. The catalysts typically have surface areas ranging from 170 $m^2$/g to 300 $m^2$/g and pore volumes ranging from 0.45 $cm^3$/g to 0.65 $cm^3$/g. [See J. I. Krochiwitz ed., *Encyclopedia of Chemical Technology*, 4th edition, Catalysis and Catalysts, Vol. 5: 320 (1991).] Additionally useful catalysts can also be found in the OJG International refining catalyst compilation-1987 (J. J. McKetta ed., *Encyclopedia of Chemical Processing and Designs: Petroleum Processing, Catalyst Usage*, Vol 35:87–89 Marcel Dekker (1992).] These catalysts comprise active agents such as Pt/ReCl, Ni, PtCl and other rare earth metals on alumina and zeolites. The above references are incorporated herein fully by reference.

In addition to the catalysts mentioned above, many variations are possible. Notably, these catalysts include noble metals or metal sulfide on active carbon, (2) $Ga_{13}$, $Cr_{12}$, $GaAl_{12}$ & $Al_{13}$ on PILCs, (3) M-$Al_2O_3$ with M=lanthanides, (4) $Al_2O_3$ kneaded with M, where M is Bi & Sb compounded with periodic table Group VIB & VIIB metals, (5) M-modified H-ZSM-5 and H-ZSM-11 where M is Zn, Ga, Pt-Ga, Pt-Na, Mo, Cr, K, Ca, Mg, Al, and Group VIII metals, (6) M-modified MFI (H-GalloSilicates) where M is Si/Ga, Na/Ga, Al, (7) rare earth metal exchanged Y-zeolites or Ultra stable Y-zeolites, (8) Ti oxide paired with Zr oxide, (9) M plated onto aluminum, where M is Ni, and Ni, Cr, and Al alloys.

Pure dehydrogenations are endothermic by 15 to 35 kcal/g-mol. and hence have high heat requirements. The above catalysts are normally used at temperatures ranging from 300° C. to 600° C. depending on the residence time of the chemicals in the reactor. The effective temperature for some of these catalysts can be lowered by adding free radical initiators such as I, Br, $H_2O$, sulfur compounds or oxygen and their mixtures. However, special care should be taken to avoid reaction of desirable di-radicals with free radicals generated from these initiators. This can be achieved by providing large mean free paths for these reactants in the reactor, reducing residence time and the adjustment of wafer temperatures to avoid condensation of low mass free radicals.

b. Debromination and Desulfurization Catalysts

When Y is Br or $SO_2R$, catalysts can be found in Hertler et al., *J. Org. Chem.* 28: 2877 (1963), U.S. Pat. No. : 3,268,599 (1966), Show et al., *J. Appl. Polym. Sci.* 13:2325 (1969), Chow et al., *J. Org. Chem.* 35(1):20 (1970). These references are incorporated herein fully by reference. When H is Br, and copper is a catalyst, the pyrolytic temperatures can be decreased from 550° C. to 350° C. Other catalysts include Rh, Pt, and Pd.

c. Loss Of Catalyst Function

With time, catalysts may lose reactivity due to changing their oxidative state or coke formation. The life time of the catalysts can be increased at high operating temperatures or high partial pressure of hydrogen. If catalysts lose activity by coke accumulation, they can be regenerated by careful oxidation followed by reduction with hydrogen before being returned to service. [See: J. J. McKetta ed., *Encyclopedia of Chemical Processing and Designs: Catalysis and Catalysts* Vol. 6:420; *Petroleum Processing, Catalyst Usage*, Vol 35:89 Marcel Dekker, Inc. (1992), incorporated herein fully by reference.

B. Transport Polymerization Using Electromagnetic Radiation

In addition to thermal methods for dissociating precursors, electromagnetic radiation is useful for practicing this invention. Useful electromagnetic radiation is in the infrared (IR), ultraviolet (UV) and vacuum ultraviolet (VUV) spectra. UV and VUV produce no heat, whereas IR produces heat. When used in combination, IR and either UV or VUV can dissociate precursors with increased efficiency.

Figure 3:
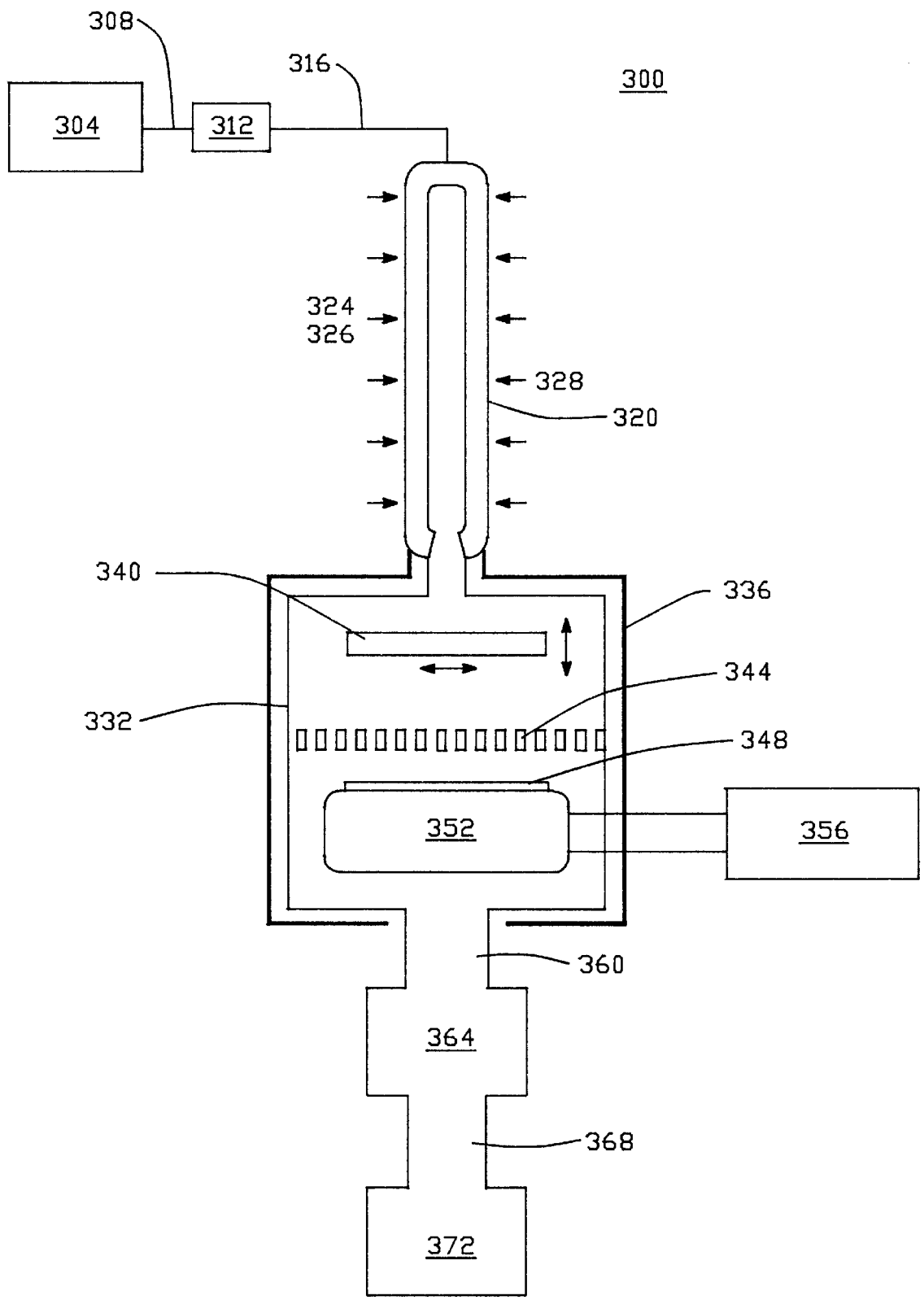
FIG. 3 depicts an embodiment of the invention used for photon assisted transport polymerization (PATP) of poly (para-xylylenes) using ultraviolet (UV), vacuum ultraviolet (VUV), and/or infrared (IR) sources.

FIG. 3 is a schematic diagram of a transport polymerization system 300 using electromagnetic radiation as an energy source for cracking precursor molecules. Precursors are transported from the precursor tank 304 through a pipe 308 and through a mass flow controller 312 through another pipe 316 and into a tube 320 which is transparent to the types of electromagnetic radiation to be used. For IR irradiation, a glass tube is sufficient. For UV irradiation, quartz tubes are necessary, and preferably are made of a single crystal quartz. For VUV irradiation, tubes made of $MgF_2$, LiF, or $CaF_2$ are necessary because the short wavelengths of VUV cannot pass easily through quartz.

After dissociating in tube 320, the reactive intermediates are transported into the deposition chamber 322 surrounded by a heater 336. The wall of the chamber is heated to decrease the deposition of molecules on the chamber wall. This heating can be accomplished by any conventional means, including, but not limited to resistive heating. After entering chamber 332, the flow of intermediates is adjusted by a movable flow pattern adjustor 340. Vertical movement of the flow pattern adjustor 340 adjusts the flow rate of intermediates into the chamber 332 and aids in mixing the intermediates more evenly within the chamber 332. Horizontal movement of flow pattern adjustor 340 adjusts the flow distribution of intermediates over the wafer 348. The flow pattern adjuster can be a flat, stainless steel plate, or alternatively can be a porous or honeycomb structure. A gas dispersion plate 344 evens the flow of intermediates over the wafer 348. Dispersion holes between the flow pattern adjuster and the wafer ensure the dispersion of the intermediates. The wafer 348 is held by a cold chuck 352, which is cooled by any chiller 356 employing any conventional means, including, but not limited to liquid nitrogen or reverse Peltier effect. A UV or VUV source also can be directed toward the wafer 348 to permit cross-linking of polymers after their deposition. A pipe 360 is for exhausting the chamber 352, and a pump 372 connected via a pipe 368 to a trap 364 maintain the pressure within the chamber at desired levels.

1. Photon Assisted Transport Polymerization of Fluorinated Poly(Para-Xylylenes)

In this invention, photolytic methods of generating radical intermediates are preferred (FIG. 3). Using the photolytic method, the above Reaction 6 can be very selective and efficient if appropriate photon sources are used. The photon sources can be provided by ultraviolet (UV) light generated by mercury vapor discharge or metal halide lamps.

Exemplary sources of UV radiation for transport polymerization can include (1) a mercury lamp that provides from 50 to 220 $mW/cm^2$ of UV ranging from 185 to 450 nm or (2) a metal halide lamp that provides from 40 to 160 $mW/cm^2$ of UV ranging from 256 nm to 450 nm. These UV sources provide photon energies ranging from 2 to 5 eV, which are sufficient for generating radical intermediates.

An alternative to conventional UV light is vacuum ultraviolet (VUV). [See Kogelschatz and Eliasson, "Microdischarge Properties in Dielectric-Barrier Discharges," *Proc. Symp. High-Pressure Low-Temperature Plasma Chemistry* (Hakone, Japan) Aug. 1–8 (1987), hereby incorporated by reference.] Incoherent excimer radiation can provide a large number of UV and VUV wavelengths for photolytic processing of various chemicals. The preferred source is incoherent excimer radiation derived from dielectric barrier discharge. UV and VUV photons that are in the ranges of 3 to 5 eV are especially useful. These energy levels are comparable with the bonding energies of most chemical bonds, thus are very effective for initiating photochemical reactions (see Table 2).

TABLE 2

| Bond Energies of Selected Bonds | |
|---|---|
| Chemical Bonds | Bonding Energies (eV) |
| φ-$CH_2Br$ | 2.52 |
| φ-$CH_2$—OR | 3.52 |
| φ-$CH_2$—$CH_3$ | 3.30 |
| φ-$CH_2$—NH | 3.09 |
| φ-$CH_2$—F | 4.17 |
| φ-$CH_2$—SR | 3.20 |
| φ-$CH_2$—H | 3.83 |

Table 2 shows the bonding energies in electron volts (eV) corresponding to certain bonds of this invention. This data is from Streitwiesser et al., *Introduction to Organic Chemistry, Appendix II*, University of California Press, Berkeley, Calif. (1992), incorporated herein fully by reference.

However, the energies of mercury vapor or metal halide UV radiation are too small to be useful for rapid transport polymerization. The desired residence time within the cracking chamber, which is the time available for photolysis should be in the range of a few milliseconds to several hundred milliseconds. Therefore, VUV is the most desirable form of energy for photon assisted transport polymerization.

VUV or incoherent excimer UV sources can be provided by dielectric barrier or silent discharge using a variety of gas or gas mixtures according to methods known in the art. For example, VUV can be generated using KrBr, $Ar_2$, ArCl, ArBr, $Xe_2$ and $F_2$ gases. Xe emits at 172 nm, Kr at 222 nm, and XeCl emits at 308 nm. As can be seen from Table 2, nearly all of the chemical bonds of interest in polymer manufacture can be broken using photolytic methods. Because excimer radiation is selective for the energy of the specific bonds, excimer radiation from a second source or alternatively, a plasma source may be used simultaneously if it is desired to break other bonds at the same time. Such a combination of excimer sources and plasma sources are useful to break bonds of precursors for making cross-linked poly(para-xylylenes). Because the leaving groups of these precursors can be different, it is desirable to break those bonds selectively to generate tri- and tetra-functional reactive intermediates.

Using photon-assisted processes of this invention, it is also possible to cross-link the novel polymers after their deposition. By directing the photons toward the surface of the polymer, the electromagnetic energy disrupts some of the C—F or C—H bonds, creating radicals, which can bond with nearby polymer chains, resulting in a cross-linked film of polymers. This can be accomplished by exposing the wafer to UV or VUV for several seconds up to several minutes.

2. Transport Polymerization Using Infrared (IR) Radiation

Figure 4:
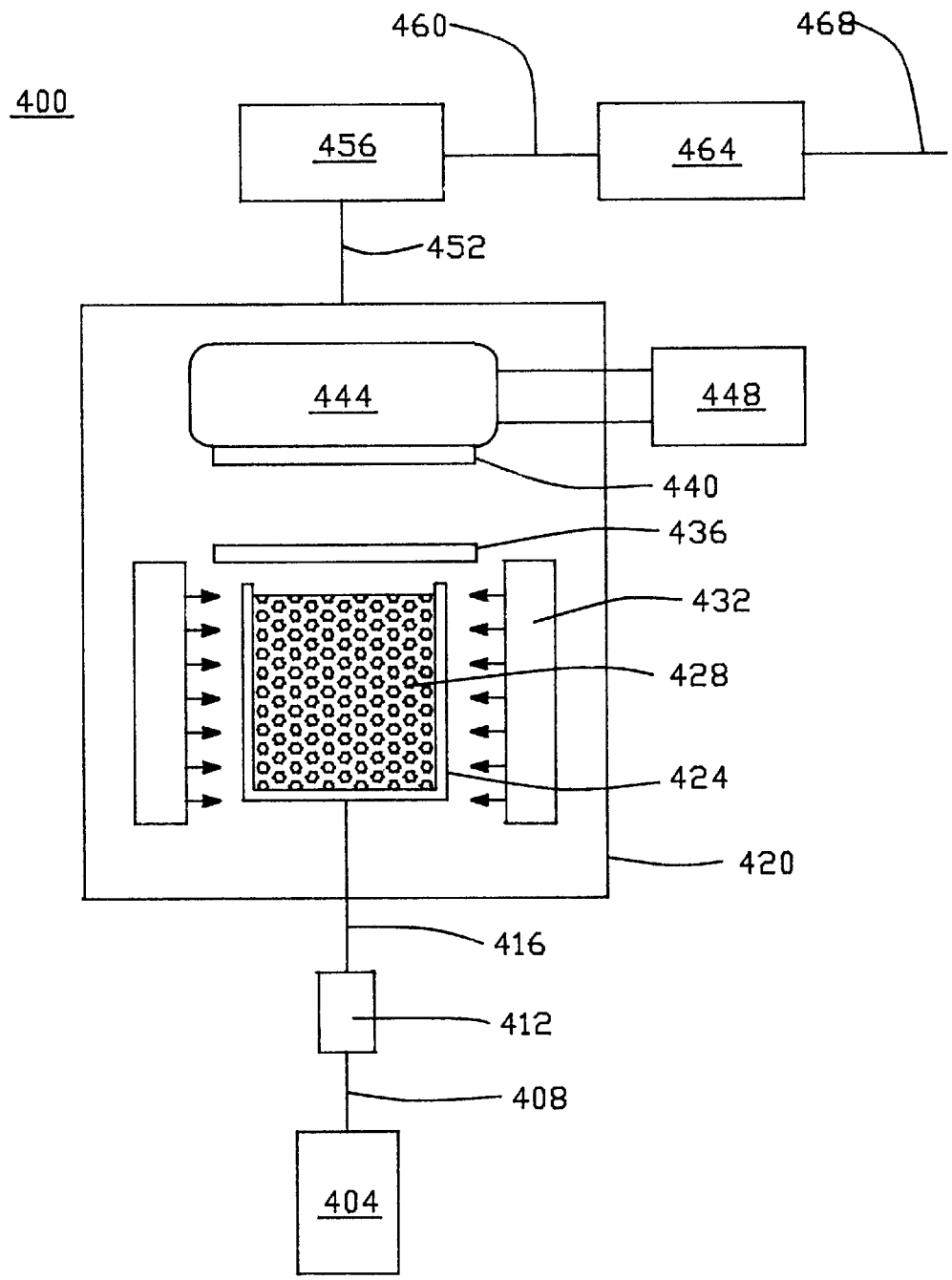
FIG. 4 depicts an embodiment of the invention used for transport polymerization using infrared (IR) radiation.

An alternative transport polymerization system employing IR radiation 400 is shown in FIG. 4. The precursors are transported from a precursor holder 404 through a pipe 408 and through a mass flow controller 412 and a second pipe 416 into the chamber 420. The chamber contains a quartz chamber 424, optionally containing a catalyst 428. An infrared radiation source 432 is placed outside the quartz container 424, and the precursors are dissociated as they pass through the quartz container 424. A diffusion plate 436 is used to optimize the flow pattern of intermediates to the wafer 440. Optionally, a flow pattern adjuster as shown in FIG. 3 (340) may be used to adjust the flow of intermediates over the wafer 440. The wafer 440 is held on a cold chuck 444, which is cooled by a conventional chiller 448. The pressure in the chamber is maintained by a pump 464 connected via a pipe 460 to and a trap 456, which is connected to chamber 420 by a pipe 452. The trap 456 protect the pump from deposition of intermediates in the pump 464.

IR radiation is preferred over resistive heating because of higher ramp rate, lower cost, more uniform heating [See P. Singer, *Semiconductor International* March 1996: p 64; A. Dip, *Solid State Technology*, June 1996, page 113], incorporated herein fully by reference. In IR radiation, a combination of both thermolytic and photolytic reactions are expected. The IR power should be in the range of from 150 to 500 Watts, preferably from 300 to 400 Watts, and most preferably 350 Watts.

3. Plasma Enhanced Transport Polymerization of Poly(Para-Xylylenes)

Plasma energy is also used to dissociate precursors into reactive intermediates. There are generally two types of energy sources for plasma enhanced transport polymerization or chemical vapor deposition. They are radiofrequency (RF) and microwave sources.

Figure 5:
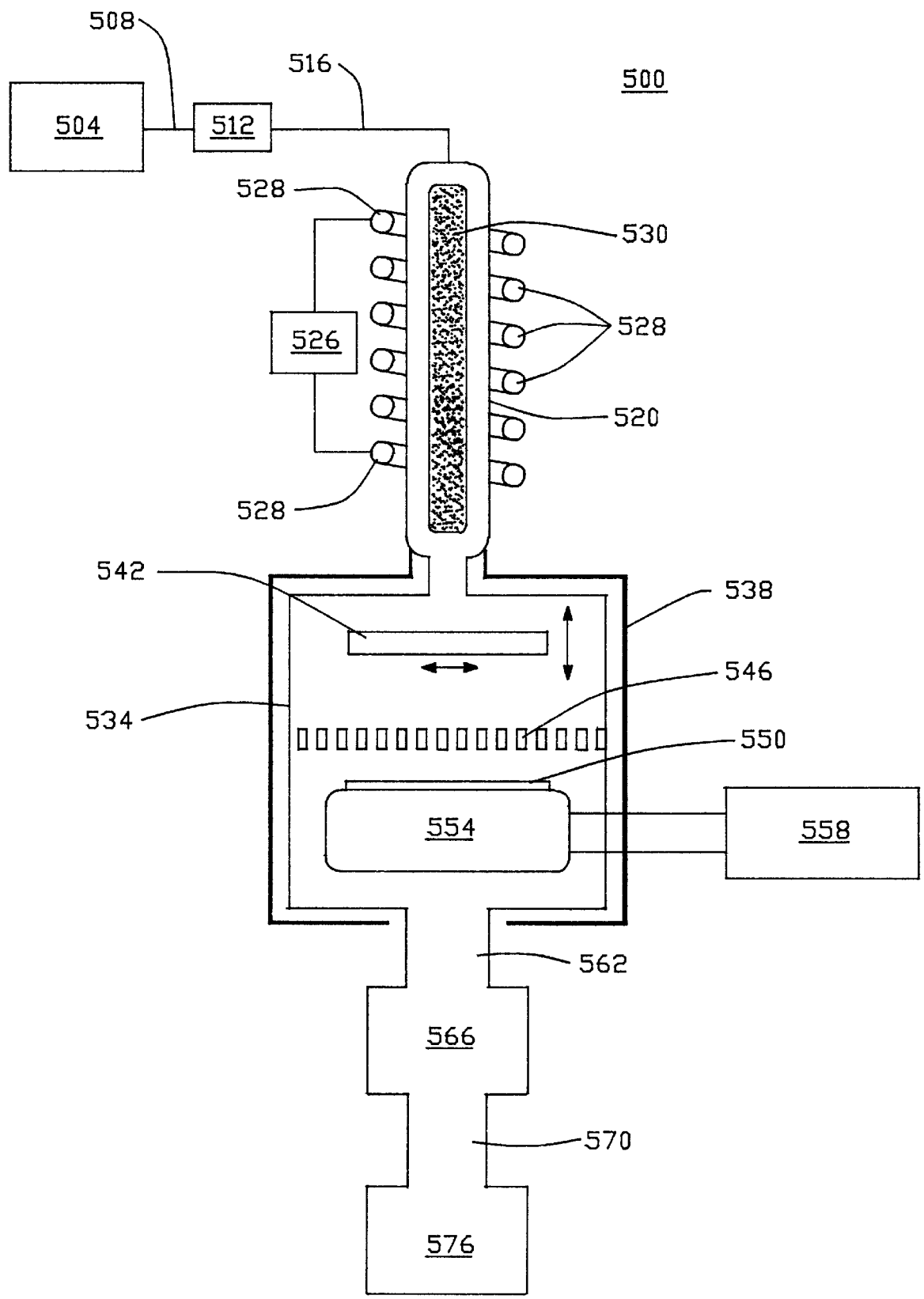
FIG. 5 depicts an embodiment of the invention used for radio frequency (RF) plasma enhanced transport polymerization (PETP) of poly(para-xylylenes).
Figure 6:
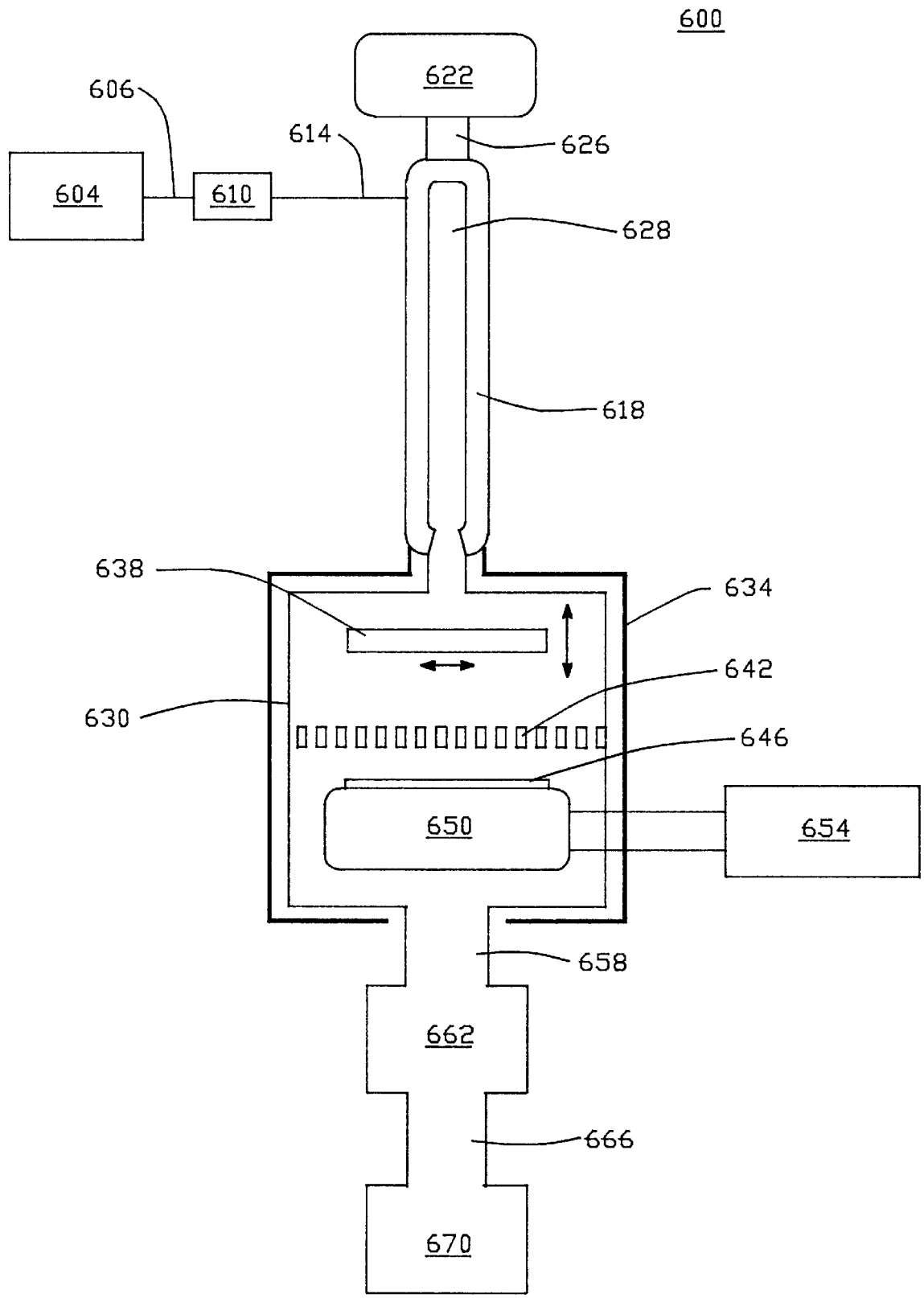
FIG. 6 depicts an embodiment of the invention for microwave plasma enhanced transport polymerization (PETP) of poly(para-xylylenes).
Figure 7:
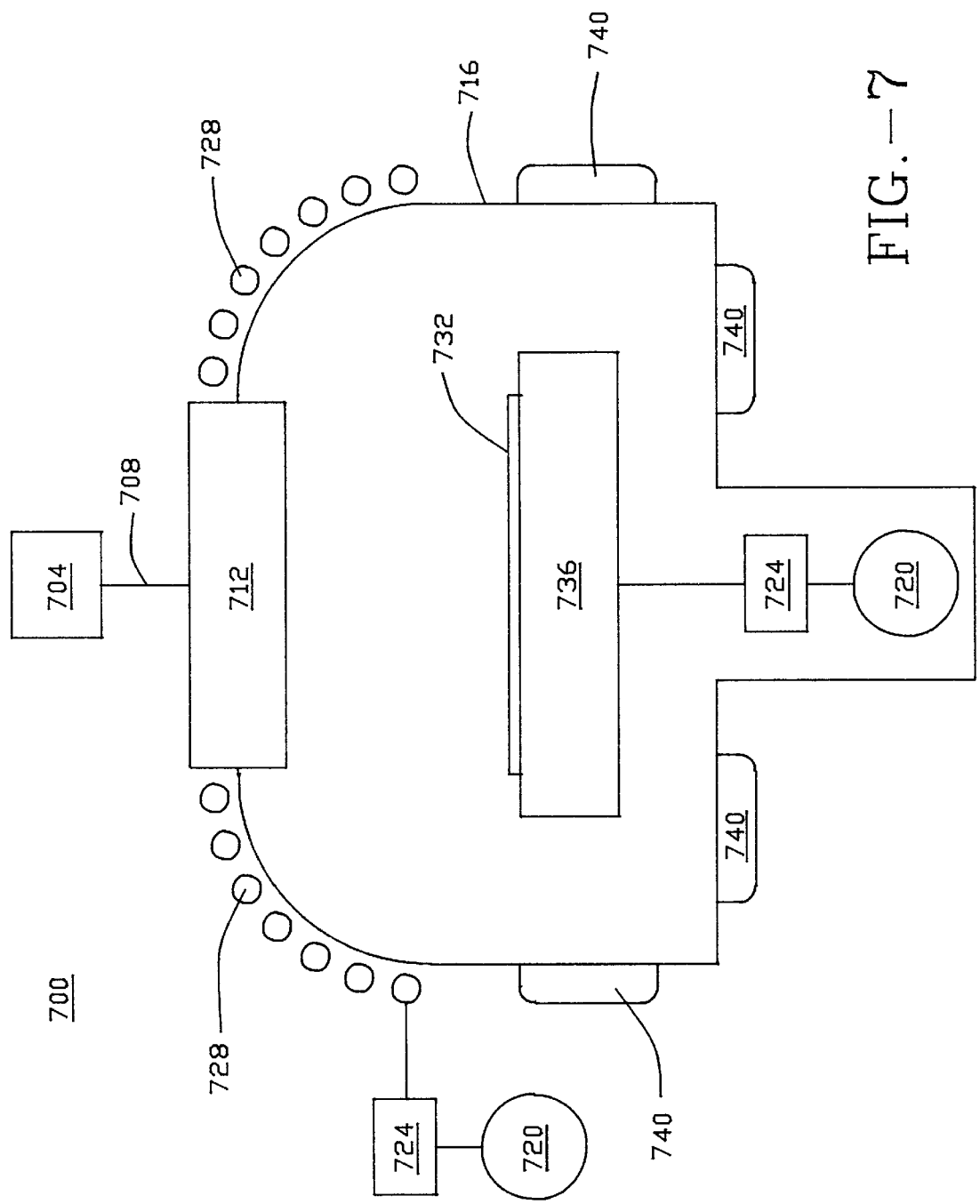
FIG. 7 depicts an embodiment of the invention for high density plasma enhanced transport polymerization of poly (para-xylylenes).

Plasma enhanced TP is carried out using the novel reactors described herein (FIGS. 5–7). With low density plasma, the electron density in the plasma is in the range of about $10^{12}$ to about $10^{13}$ electrons/$cm^3$. Low density plasma TP and CVD can be carried out at about 100 milliTorr to about 100 Torr. High density plasma (HDP) is characterized by electron densities in the range of about $10^{13}$ to about $10^{14}$ electrons/$cm^3$. High density plasma TP and CVD can be carried out at pressures of about 0.1 milliTorr to about 100 milliTorr. The higher electron density in HDP increases the formation of cross-linked polymers, because the higher energy density increases the numbers of tri-radical intermediates which can form cross-links between polymer chains.

3a. Plasma Enhanced Transport Polymerization of Poly(Para-Xylylenes) Using a Radio Frequency Plasma Generator FIG. 5 is a schematic diagram of a transport polymerization system 500 employing RF to generate a plasma. The precursors are stored in a precursor holder 504, are transported via a pipe 508 and through a liquid injector for liquid precursors, or a mass flow controller 512 for gasses, then are transported via another pipe 516 into a plasma tube 520 made of quartz. Preferably, the tube 516 is made of a single quartz crystal. Precursors are exposed to RF energy generated by a RF generator 526, through a coil 528, and a plasma 530 is thereby generated. The plasma 530 then flows into a deposition chamber 534 which is surrounded by a heater 538. The heater 538 keeps the walls of the chamber 534 above the condensation temperature of the reactive intermediates. This prevents condensation of intermediates onto the walls of the chamber 534. The flow of intermediates is adjusted by a flow pattern adjuster 542. Vertical movement of the flow pattern adjuster 542 adjusts the flow rate of intermediates into the chamber 534, and aids in mixing the intermediates in the chamber 534. Horizontal movement of the flow pattern adjuster 542 adjusts the distribution of the intermediates over the surface of wafer 550. A gas dispersion plate 546 with holes distributes the flow of intermediates evenly over the surface of the wafer 550.

The wafer 550 is held on a cold chuck 554, which is kept cool by a chiller 558 employing any conventional cooling method, including liquid nitrogen and reverse Peltier effect. The chamber is connected via a pipe 562 to a cold trap 566, which traps undeposited intermediates. The pressure in the chamber 534 is maintained by a pump 576 connected to trap 556 by a pipe 570.

Frequencies needed to generate plasmas are in a range of from 1 kHz to 2.5 GHz. A preferred range is between 400 kHz and 13.56 MHz, with the most preferred frequency being 13.56 MHz. The power should be in the range of about 30 Watts to about 300 Watts. Preferred power is from about 100 Watts to about 200 Watts, and the most preferred power is about 200 Watts of discharge power. The pressure should be kept within a range of from 0.001 Torr to 100 Torr, preferably from 50 milliTorr to 500 milliTorr, and most preferably at 100 milliTorr pressure. Alternatively, using low frequencies (5 kHz) can result in formation of insoluble poly(para-xylylene) which have higher temperature resistance. Morita et al. Trans. *IEEE Japan* pp: 65075 (1972). A carrier gas such as nitrogen or argon is used, and the flow rates of the carrier gas should be from 30 to 90 SCCM, preferably from 50 to 75 SCCM.

3b. Plasma Enhanced Transport Polymerization of Poly(Para-Xylylenes) Using a Microwave Generator Microwave sources can also be used to generate plasmas for generating the reactive intermediates. FIG. 6 is a schematic diagram of a transport polymerization system employing microwaves. Precursors are held in a precursor tank 604, and are vaporized, pass through a pipe 606 and through a mass flow controller 610, through a second pipe 614 and into a quartz tube 618. A microwave generator 622 is attached via a waveguide 626 to one end of the quartz tube 618. Microwave energy enters the quartz tube 618 where a plasma 628 is generated, which dissociates the precursors into reactive intermediates. After dissociation, the intermediates are transported into a chamber 630 heated by a heating device 634, including, but not limited to resistive heater. The flow of the intermediates is controlled by a flow pattern adjustor 638. Vertical movement of the a flow pattern adjustor 638 adjusts the flow rate of intermediates into chamber 630 and adjusts the mixing of intermediates in chamber 630. A gas dispersion plate 642 evenly distributes the intermediates over the surface of wafer 646. The intermediates deposit on the wafer 646, which is held by a cold chuck 650, which is attached to a chiller 654 employing any conventional cooling means, including, but not limited to liquid nitrogen or reverse Peltier effect. The chamber pressure is controlled by a pump 670, connected via a pipe 666 to a cold trap 662. The trap 662 is connected via a pipe 658 to the chamber 630. The cold trap 662 protects the pump 670 from deposition of intermediates.

Microwave power density or electron field strength is selected based upon the residence time of the precursors in the chamber. The power is generally between 200 and 700 Watts, preferably between 400 and 600 Watts, and most preferably at 500 Watts. Desirable electron energy is chosen to match the bond energy of the leaving group.

An inert gas such as argon can also be used in the new TP systems of the present invention. With inert gases in the chamber, the amount of oxygen can be reduced without going to very high vacuum. The reduction of oxygen content is important for reducing the formation of —C—O—C—, —C—O—O— and C—O—H bonds in the resulting polymer networks. Formation of these chemical bonds is known to increase dielectric constant, possibly due to higher polarity in C—O bonds comparing to that of C—C bonds. In addition, the more flexible C—O—C bonds will decrease the glass transition temperatures of the resulting polymers (See Chung J. Lee, "Polyimides, Polyquinolines and Polyquinoxalines: Tg-Structure Relationships", *Rev. Macromol. Chem. Phys.*, C29(4):431–560 (1989)), incorporated herein fully by reference. The presence of C—O—O or C—O—H bonds will also lower the thermal stability of the resulting polymers due to their liability to form C•, •O—O• and •OH free radicals that will attack polymer chains and lead to polymer degradation.

In one option of this invention, the pressurized reactor can be avoided. In this case, the Compound IIIc can be prepared in a solution using DAST as described by Hasek et al., *J. Amer. J Chem. Soc.* 82:543 (1960), incorporated herein fully by reference.

The Compound IIIc can be used therefore directly for current TP systems. In another option of the current invention, when a conventional furnace is used to split the Compound IIIa, a catalyst can also be placed in the furnace. Yet in another embodiment of this invention, when IR and VUV is used, a free radical initiator such as $Br_2$ or $I_2$ can be injected into the system to increase the yield or the efficiency of the above Reaction 1.

To prevent condensation of precursor, intermediates, or products on the chamber walls, the pressure within the reaction vessel should be below atmospheric pressure. Pressures in the range of 0.001 to 200 Torr work well. Furthermore, to inhibit condensation of chemicals, the walls of the reaction chamber should be kept warm, preferably in the range of 50° C. to 150° C., preferably above 100° C. Although resistive heaters can be used, IR is preferably used along with VUV. The IR radiation heats the precursors to a threshold temperature, requiring less VUV power to complete the cracking reaction. IR also heats the chamber walls to decrease deposition on them because VUV is a cold light source which does not heat up the chamber.

Deposition and polymerization of reactive intermediates to form low dielectric polymers is achieved by placing the wafer on a cold chuck. The temperature of the cold chuck should be between −30° C. and 30° C., preferably at −5° C. Any suitable method for cooling the cold chuck may be used, including reverse Peltier, liquid nitrogen, or conventional refrigeration methods. Reverse Peltier and liquid nitrogen cooling methods are preferred. To prevent condensation of chemicals on the pump, a cold trap is placed between the vacuum pump and the deposition chamber.

3c. High Density Plasma Chemical Vapor Deposition

A high density plasma deposition process can also be used to dissociate precursors. In contrast to the low density plasma process described above, in high density plasmas, the electron density is in the range of from about $10^{13}$ to $10^{15}$ electrons/$cm^3$. This process must be carried at lower pressures than conventional plasma processes. In this embodiment, a inductively coupled high density plasma apparatus 700 is shown schematically in FIG. 7. A precursor delivery system 704 volatilizes or vaporizes the precursor, which flows through a pipe 708 and an anode gas injector 712 into the deposition chamber 716. The anode gas injector 712 is attached to RF generators 720 which are matched by matching controllers 724. The output of the RF generators 720 passes through inductive coils 728 to produce an electrical field. The wafer 732 is held by a cathode electrostatic chuck 736, which is connected to the RF generator 720. IR sources 740 provide additional heating of precursors to decrease the needed plasma power and to inhibit condensation on the chamber wall. The plasma source power is in the range of about 1 Watt/$cm^2$ of wafer surface area to about 15 Watts/$cm^2$, preferably about 2 Watts/$cm^2$ to about 10 Watts/$cm^2$, and more preferably about 5 Watts/$cm^2$. The chamber pressure is maintained in the range of 0.01 milliTorr to 10 milliTorr, and preferably below 5 milliTorr by a pump and cold trap (not shown). The wafer temperature is in the range from about 300° C. to 450° C., and is preferably about 350° C.

3d. Combined Transport Polymerization and CVD Apparatus Utilizing Combined Photon and Plasma Processes FIG. 8 depicts a schematic diagram of a TP and CVD reactor 800 embodying the elements for photon-plasma and IR dissociation and deposition. Precursors 804 are stored in a precursor container 808 which is connected via a pipe 812 to a mass flow controller 816. For TP, precursors are transported into a dissociation reactor 824 which houses the dissociation chamber 828. The wall of reactor 824 is made of crystalline materials such as LiF, $MgF_2$, or $CaF_2$, which permits light of vacuum ultraviolet wavelengths to pass. Vacuum ultraviolet and ultraviolet light is generated by a silent discharge plasma generators 832, which are place inside infrared heaters 836. The infrared heaters 836 are placed inside DC magnets 840 and AC magnets 844. The magnets regulate the flow of plasma during dissociation, and the reactive intermediates so generated are transported to a deposition reactor 850.

The deposition reactor 850 contains a deposition chamber 860 containing a gas and reactant dispersion manifold 854, a gas and reactant dispersion plate 858. The walls of the deposition chamber are made of crystalline materials such as LiF, $MgF_2$, or $CaF_2$, which permits light of vacuum ultraviolet wavelengths to pass. The gas dispersion manifold 854 and the gas dispersion plate 858, are used to adjust the distribution and homogeneity of the intermediates. The intermediates are directed toward the wafer 862, which is held on a cold chuck 864. The gas dispersion manifold 854 and dispersion plate 858 are connected in parallel to a DC voltage bias anode 868, a DC voltage bias cathode 869, an AC voltage bias anode 870, and an AC voltage bias cathode 871. Silent discharge plasma generators 872 are placed outside the deposition chamber 860. Infrared heaters 874 are placed outside the silent plasma discharge generators 860 and DC magnets 878 and AC magnets 880 are placed outside the infrared heaters 874. Gasses exit the deposition chamber 860 through a pipe 884, pass through a cold or reactive trap 888, pass through another pipe 892 to a vacuum pump 896. The pressure in the systems is maintained at a desired pressure using pump 896. The trap 888 protects the pump from deposition of intermediates.

For CVD, the deposition chamber can be used without the dissociation reactor. Precursors are placed directly on wafer 862, and the chuck 864 is not cooled. IR, UV, or VUV radiation is directed toward the wafer 862. The radiation dissociates the precursor, and deposition of intermediates and polymerization takes place on the wafer.

Table 4 shows process conditions for combined photon-plasma assisted precursor dissociation using chamber 828, and Table 5 shows process conditions for combined photon-plasma precursor deposition in deposition chamber 860.

TABLE 4

Process Conditions for Photon-Plasma Precursor Dissociation

| Variable | Range | Preferred Range |
|---|---|---|
| Temperature | 200° C.–600° C. | 350° C.–500° C. |
| Photon Wavelength | 100 nm–400 nm | 140 nm–300 nm |
| Photon Energy | 2.5 eV–12 eV | 4 eV–9 eV |
| Photon Flux | 10 milliW/cm$^2$–5 W/cm$^2$ | 40–100 milliW/cm$^2$ |
| Plasma Density | $10^{12}$–$10^{14}$ electrons/cm$^3$ | $10^{13}$ electrons/cm$^3$ |
| Pressure | 0.1 milliTorr–10 Torr | 1 milliTorr–100 milliTorr |

TABLE 5

Process Conditions for Photon-Plasma Precursor Deposition

| Variable | Range | Preferred Range |
|---|---|---|
| Temperature | –20° C.–300° C. | –10° C. |
| Photon Wavelength | 100 nm–400 nm | 250 nm |
| Photon Energy | 2.5 eV–12 eV | 4.5 eV |
| Photon Flux | 10 milliW/cm$^2$–5 W/cm$^2$ | 10–100 milliW/cm$^2$ |
| Plasma Density | $10^{12}$–$10^{14}$ electrons/cm$^3$ | $10^{13}$ electrons/cm$^3$ |
| Pressure | 0.1 milliTorr–10 Torr | 1 milliTorr–100 milliTorr |

TABLE 6

Process Conditions for Photon-Plasma Precursor Chemical Vapor Deposition

| Variable | Range | Preferred Range |
|---|---|---|
| DC Bias Voltage | 100–2000 V | 500 V |
| AC Bias Voltage | 10–200 V | 50 V |
| Pulsed Bias Voltage | 100–4000 V | 500 V |
| Pulse Width | 10–1000 msec | 1 msec |
| Pulse Frequency | 10 Hz–1000 Hz | 60 Hz |
| DC Magnetic Field Strength | 100–2000 Gauss | 700 Gauss |
| AC Magnetic Field Strength | 100–1000 Gauss | 500 Gauss |
| AC frequency | 10 Hz–500 Hz | 50 Hz–60 Hz |
| Pressure in Silent Discharge Generator | 100 Torr–1500 Torr | 760 Torr |
| AC Power to Silent Discharge Generator | 100 Watts–2000 Watts | 500 Watts |

The plasma density is reported as electron density, but it is to be noted that ion density must be the same to maintain charge neutrality of the plasma. Any non-uniformity of charge distribution can result in plasma damage to the thin film of low dielectric material, as well as imparting charge to the integrated circuit components.

Control of the plasma is by a magnetic field within the precursor chamber and in the deposition chamber. In the precursor reactor, the plasma is confined to any desired area, such as the center of the reactor. Additionally, alternating the polarity of the magnetic field stirs the plasma, ensuring even energy distribution within the plasma, thereby increasing the efficiency of dissociation of precursor molecules into reactive intermediates. In the deposition chamber, the magnetic field is used to control the pattern of distribution of intermediates over the wafer. This would serve two purposes: (1) to direct the deposition of precursor to the desired portion of the surface, thus conserving the precursor, and (2) minimize film deposition on other parts of the reactor chamber, thus minimizing the required cleaning, minimizing particle generation, and simplifying the reactor chamber design.

Another feature comprises the placement of an electrical bias voltage within the deposition chamber. This provides a further means of controlling the flow of plasma-ionized species to the site of deposition on the wafer. A bias voltage, in the form of direct current (DC) or alternating current (AC) can be applied and modulated. Pulsed voltages can be used to alter the flow pattern of ions to either accelerate, decelerate, or to regulate the density of the plasma ions in the stream reaching the wafer. Optimization of ion velocity and flow, thus can be obtained using various combinations of magnetic field and bias voltage. Table 6 shows the ranges of the various magnetic field and bias voltage variables which are regulated in this invention.

TABLE 7

Optimization of Electrical and Magnetic Filed Variables for Dissociation

| Variable | Range | Preferred Range |
|---|---|---|
| Pressure in Silent Discharge Generator | 100 Torr–1500 Torr | 500 Torr |
| AC Power to Silent Discharge Generator | 100 Watts–2000 Watts | 500 Watts |
| AC Magnetic Field Strength | 100 Gauss–1000 Gauss | 500 Gauss |
| DC Magnetic Field Strength | 100 Gauss–2000 Gauss | 700 Gauss |

TABLE 8

Optimization of Electrical and Magnetic Field Variables for Deposition

| Variable | Range | Preferred Range |
|---|---|---|
| DC Bias Voltage | 100–2000 V | 500 V |
| AC Bias Voltage | 10–200 V | 50 V |
| Pulsed Bias Voltage | 100–4000 V | 500 V |
| Pulse Width | 10–1000 msec | 1 msec |
| Pulse Frequency | 10 Hz–1000 Hz | 60 Hz |
| DC Magnetic Field Strength | 100–2000 Gauss | 700 Gauss |
| AC Magnetic Field Strength | 100–1000 Gauss | 500 Gauss |
| AC frequency | 10 Hz–500 Hz | 50 Hz–60 Hz |

Other reactors and reactor configurations may be used, as exemplified by the co-pending applications, incorporated herein fully by reference.

III. Formation of Cross-Linked Poly(Para-Fluoroxylylenes)

To form cross-linked poly(para-fluoroxylylenes), precursors are selected with the following chemical structures:

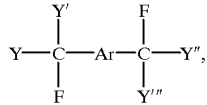

wherein Ar is a fluorinated aromatic moiety of 6 carbon atoms, wherein Y, Y', Y", and Y'" are leaving groups independently selected from the group consisting of —SR, —NR$_3$, —H, —SO$_2$R, —Cl, —Br, and —I, and wherein R groups are H, alky, or aromatic groups.

By selecting precursors with different Y, Y', Y", and Y'", and processing them to form reactive intermediates, multi-radical intermediates can be made. Cracking of these different C—Y, C—Y', C—Y", and C—Y'" bonds can be accomplished using combinations of excimer radiation or plasma, using devices such as those described in FIGS. 3 and 5–8. By selecting the wavelength of excimer radiation used, formation of radical intermediates can be tailored to the specific need. If additional C—Y bonds are to be broken, an additional energy source such as plasma can be used.

Upon deposition and polymerization of multi-functional radicals, a cross-linked polymers are made. These cross-linked polymers have higher thermal stability, are stronger, and therefore have mechanical properties making them well suited for making integrated circuits of small feature size. Because they are made of fluorinated moieties, their dielectric constant is also low.

The degree of cross linking can be varied by selecting desired leaving groups. The degree of cross linking is also varied by selecting the appropriate ratios of precursors which form bi-functional radicals and precursors which form multi-functional radicals upon cracking. Increasing the proportion of multi-functional precursor increases the degree of cross-linking.

Moreover, the degree of cross-linking can be varied by varying the degree to which the precursors are cracked. An incompletely cracked multi-functional precursor will have fewer cross-linking bonds available than a fully cracked multi-functional precursor. Thus, the physical and electrical properties of polymer films can be adjusted to suit the particular need of the user.

An alternative way of manufacturing cross-linked poly (para-xylylenes) is to manufacture a thin layer of polymer on a wafer using bi-functional precursors and then exposing the wafer to light of an appropriate wavelength to photolyze selected C—Y bonds within the polymer. This permits cross-linking of polymers through bonding of adjacent reactive groups.

It is also possible to cross-link polymers after their deposition on wafer surfaces. These reactions are carried out by exposing the polymer to UV light for several seconds up to several minutes. Sharangpani and Singh, *DUMIC*:117–120 (1997), incorporated herein fully by reference.

IV. Manufacture of Integrated Circuit Chips Made With Poly(Para-Xylylenes)

The above precursors and methods are intended to provide polymers with low dielectric constants and high thermal stability for the manufacture of integrated circuits. FIG. 9 depicts a diagram of a multi-level integrated circuit chip 900 embodying the features of this invention. The substrate 904 is planarized prior to further processing. Then a source region 908, a drain region 912, and a polysilicon gate 916 are manufactured on the substrate 904. The wafer 900 is inserted into a deposition chamber for TP or CVD, and a first Interlevel dielectric (ILD) layer 920 of PPX, cross-linked PPX, F-PPX, cross-linked F-PPX, PPFX, cross-linked PPFX, F-PPFX, or cross-linked F-PPFX overlays the substrate 904 and polysilicate gate 916. A floating polysilicon gate 924 is overlain by a second ILD layer 928, a first metal line 932 and an intermetal dielectric (IMD) layer 936. On top of the IMD layer 936, a second metal line 940 and a second IMD layer 944 is deposited. After each step of the deposition is completed, the wafer is planarized using chemical mechanical polishing or other method known in the art.

The polymer surface is subjected to chemical mechanical planarization to create a smooth surface for further layers of polymer. A second layer of metal lines is annealed to the planarized surface, the wafer is inserted into a CVD chamber, wherein a second layer of poly(para-xylylene) is deposited, again, filling the gaps between the metal lines. After a second chemical mechanical planarization process, the wafer is completed.

V. Manufacture of Integrated Circuit Chips Made Combinations of Different Poly(Para-Xylylenes)

By varying the composition of different precursors, different polymer properties can be attained. For example, by combining di-functional precursors with multi-functional precursors, it is possible to manufacture polymers with properties different from those of either precursor alone. Because the multi-functional precursors can form cross-links with other polymers, the resulting thin film will have increased mechanical strength. By diluting the multi-functional precursor with di-functional precursor, the mechanical strength of the thin film can be tailored to suit the individual needs of the user.

Moreover, by varying the composition of precursors during the TP or CVD processes, it is possible to vary the composition of the polymer layer during its deposition. Thus, a user may deposit one type of polymer close to the substrate and change the composition of the polymer progressively, resulting in a different polymer at the surface of the dielectric layer. Such changes in polymer composition can be done step-wise by ceasing delivery of a first precursor and starting the delivery of a second precursor. Moreover, subsequent different layers of polymer may be deposited by changing to third and subsequent precursors. Furthermore, a gradient in polymer composition is achieved by gradually changing the relative proportions of different precursors during deposition.

VI. General Methods for Measuring Properties of Polymer Thin Films

The dielectric constant, K of polymer thin films is determined by measuring the refractive index of the deposited film using methods known in the art. The K is then calculated as the square of the refractive index.

The glass transition temperature Tg can be determined from observing changes in heat capacity, modulus, or thermal expansion of a polymer specimen with changes in temperature. For example, Tg can be obtained by heating a polymer specimen in a differential scanning calorimeter (DSC) that measures the heat capacity of the polymer or by a thermal mechanical analyzer (TMA) that measures thermal expansion of the polymer as the temperature is increased. These methods are standard in the art and will not be discussed further.

The thermal stability is reflected by the decomposition temperature (TD) of a polymer. The Td is determined using a thermogravimetric analyzer (TGA). The wafer is progressively heated, and the weight loss of the sample is determined using a microbalance. This is commonly performed in a nitrogen atmosphere, to eliminate the possibility of oxidation of the polymer during heating. Published data such as the % weight loss and initial weight loss temperature, shows that Td depends not only on the temperature, but also upon the heating rate employed during measurements. This method is standard in the art and will not be discussed further.

Young's modulus, E, and shear modulus, G, are obtained using well known ASTM methods, which will not be discussed further.

The residual stress on a polymer on a Si substrate, $\sigma^r$, can be assessed using a bending beam method (BBM) that monitors polymer/Si beam deflections resulting from mismatch of the coefficients of thermal expansion (CTE) of the polymer thin film and the Si substrate. Therefore, the deflections caused by a beam directed at a polymer/Si substrate sample relative to the deflections of a beam directed at a Si substrate reference sample are recorded over various temperatures. From this information, the residual stress can be calculated using standard methods, which will not be discussed further.

Other embodiments of the invention are described in the Examples below.

EXAMPLE 1

Preparation of Precursors

A di-aldehyde starting material, $O=CH-C_6H_4-HC=O$ (Aldrich Chemical, T220-7) was reacted with $SF_4$ in a pressurized, stainless steel reactor at 150° C. under 1300 pounds per square inch (psi) for 13 hours. The reaction results in a yield of the desirable precursors of about 70% according to Hasek et al., J. Amer. Chem. Soc 82:543 (1960), incorporated herein fully by reference.

In an alternative reaction, the starting material, $O=CH-C_6H_4-HC=O$ was reacted with diethyl aminosulfurtrifluoride (DAST, pre-prepared from $SF_4$) at 25° to 50° C. for 0.5 h to 4 h, resulting in a yield of desirable precursors of about 70%. Because DAST is less toxic than $SF_4$, the DAST method is preferred.

EXAMPLE 2

Transport Polymerization Using a Resistive Heating Pyrolyzer

To form a polymer thin film on a wafer substrate, the wafer was first cleaned with UV light generated by a mercury vapor lamp (Dumax, 5000EL). The duration of the cleaning step was dependent upon the power used. At 20 mW/cm$^2$, 10 min was required, at 200 mW, one min was required, and at 400 mW/cm$^2$, 0.5 min was required. To decrease the time required, 400 mW/cm$^2$ is preferred.

The above precursor, $CF_2H-C_6H_4-CF_2H$ was cooled to temperatures ranging from about -5° C. to about 20° C., with preferred range of from about -5° C. to about 15° C. in a liquid sample holder. The precursor was then vaporized under a vacuum of about 1 to 10 milliTorr into a reactor via a needle valve or a mass flow controller to regulate its injection rates. The precursor, once introduced into the reactor, was subjected to a pyrolytic temperature ranging from 740° C. to 780° C. (FIGS. 1 and 2). The injection rate and pyrolysis of the precursor was conducted under a vacuum pressure ranging from 15 mTorr to several Torr.

Some of these thin films may also have many micro voids with pore sizes ranging from 10 Å to 50 Å. The resulting thin films had a reflective index of from 1.48 to 1.54 and dielectric constants ranging from 2.15 to 2.40 depending on the pyrolytic conditions. Higher temperatures result in higher cross-linking and higher dielectric constant. Their XPS spectra suggested the presence of C—F, indicative of cross-linking for thin films prepared under these pyrolytic conditions.

EXAMPLE 3

Transport Polymerization Using a Noble Metal Catalyst

The methods described above for Example 2 were repeated with the following changes: About 100 grams of catalyst pellets (1 wt % Pt on porous Alumina; Cat. Number 23211-4 was obtained from Aldrich Chemical Co., 1001 West Saint Paul Ave. Milwaukee, Wis. 53233. The catalyst was reduced under hydrogen before its use. The catalyst was loaded inside the pyrolyzer, which was heated at a temperature from about 400° C. to about 450° C. during deposition. The deposition was performed at a chamber pressure of about 60–90 milliTorr on a cold wafer at a temperature of about 0° C. for 60 minutes. The polymer film had a refractive index of about 1.523 and was 1000 Å in thickness.

EXAMPLE 4

Transport Polymerization Using a Transition Metal Oxide Catalyst

The methods described above for Example 3 were repeated with the following changes: 125 ml of dehydrogenation catalyst (Iron Oxide compound on porous Alumina, Cat. Number C-035 from Criterion Catalyst Company, 2 Greenpoint Plaza, Suite 1000, 16825 Northchase Drive, Houston, Tex. 77060) was used. The deposition was performed at a chamber pressure of about 260 to 280 milliTorr on a cold wafer at a temperature of about 0° C. for 60 minutes. The film had a refractive index of 1.513 and was about 1210 Å in thickness.

EXAMPLE 5

Transport Processing Using a BIS-Mercapto Precursor

A new precursor, a BIS-mercapto derivative of Br—$CF_2$—$C_6H_4$—$CF_2$—Br, or $C_2H_5S$—$CF_2$—$C_6H_4$—S—$CF_2$—$C_2H_5$ was used in the above Example 2 (FIGS. 1 and 2). The BIS-mercapto compound was prepared from a dibromo derivative of the tetrafluoro precursor, Br—$CF_2$—$C_6H_4$—$CF_2$—Br, according to the method of Chow et al. (U.S. Pat. No. 3,274,267), incorporated herein fully by reference.

The precursor was heated to temperatures ranging from 25° C. to 50° C. in a solid sample holder. The precursor was then vaporized under a vacuum of about 1 to 10 milliTorr into a reactor via a needle valve or a mass flow controller to regulate its injection rates. The precursor, once introduced into the reactor, was subjected to a pyrolytic temperature ranging from 450° C. to 700° C. (FIGS. 1 and 2). The injection rate and pyrolysis of the precursor was conducted under a vacuum pressure ranging from 15 mTorr to several Torr.

The pyrolytic temperatures are lowered to the range of from about 500° C. to about 650° C. when the BIS-mercapto derivative is used as precursor. From this precursor, more linear and crystalline polymers can be made. These resulting thin films have dielectric constants of from 2.2 to 2.3. From their XPS spectra, these thin films, in general, exhibit higher $CF_2$ contents than those obtained from Example 2.

EXAMPLE 6

Transport Polymerization Using a BIS-Amino Precursor

Another new precursor, a diamino derivative of $BrF_2C$—$C_6H_4$—$CF_2Br$, or $(CH_3)_3N^+$—$CF_2$—$C_6H_4$—$CF_2$—$N^+(CH_3)_3$ can also be used as a precursor for transport polymerization (FIGS. 1 and 2). The diamino compounds can be prepared from the dibromo derivatives according to Lee et al. (U.S. Pat. No. 4,849,559), incorporated herein fully by reference.

The precursor is heated to temperatures ranging from 25° C. to 60° C. in a solid sample holder. The precursor is then vaporized under a vacuum of about 1 to 10 milliTorr into a reactor via a needle valve or a mass flow controller to regulate its injection rates. The precursor, once introduced into the reactor, is subjected to a pyrolytic temperature ranging from 740° C. to 780° C. (FIGS. 1 and 2). The injection rate and pyrolysis of the precursor is conducted under a vacuum pressure ranging from 15 mTorr to several Torr.

The pyrolytic temperatures are lowered to the range of from about 450° C. to about 550° C. From this precursor, more linear and crystalline polymers can be made. These polymers have dielectric constants of from 2.2 to 2.3. From their XPS spectra, these thin films, in general exhibit higher $CF_2$ contents than those obtained from Example 2.

EXAMPLE 7

Transport Polymerization Using Vacuum Ultraviolet Light as a Di-Radical Generator The processes and chemicals described in Examples 1, 2, 5, and 6 above can be used as described except for the substitution of the resistive pyrolyzer with a vacuum ultraviolet (VUV) generating source using the dielectric barrier discharge principle (FIG. 3).

The silent discharge provides VUV in the range of 140 to 200 nm. Depending on the conditions and precursors, linear or highly cross-linked polymers with dielectric constants ranging from 1.99 to 2.34 can be prepared by decreasing the wave length of VUV.

EXAMPLE 8

Transport Polymerization Using a Perfluorinated Precursor

A fully fluorinated precursor is manufactured by reacting a tetrafluorobenzene with $LiCH_2CH_2CH_2CH_3$ at −78° C. in tetrahydrofuran (THF) for 0.5 to 1 h. The resulting product is then further reacted with $CH_3CH_2CHO$ to generate CHO—$C_6F_4$—CHO. The resulting perfluoro-dialdehyde is then converted into the corresponding $CHF_2$—$C_6F_4$—$CHF_2$ using DAST according to Example 1.

The perfluorinated precursor is used according to Examples 2, 5, and 6 above to yield polymer thin films. These films have dielectric constants of from 1.80 to 2.10. Films with higher dielectric constants are made by increasing the pyrolytic temperatures from 740° C. to 770° C., or by decreasing the VUV wavelength from 180 nm to 140 nm. These polymers are thermally stable up to 450° C. to 500° C.

EXAMPLE 9

Transport Polymerization Using αα' Dibromo-ααα'α'-Tetrafluoro-p-Xylene

Example 8 was repeated using αα' dibromo-ααα'α'-tetrafluoro-p-xylene as a precursor. Accordingly, 250 ml of αα' dibromo-ααα'α'-tetrafluoro-p-xylene (obtained from Marshalltom Research Laboratories) was heated to 30° C. The stainless steel pyrolyzer was heated to a temperature of about 768° C. to 775° C. The deposition was performed at a chamber pressure of about 30 milliTorr to 60 milliTorr on a cold wafer at a temperature of about 0° C. Deposition occurred over a time period of 6 hours. The resulting thin film had a refractive index of 1.532, and a thickness of about 1350 Å.

These Examples are for illustrative purposes only, and are not intended to limit the scope of the invention. Rather, many variations of the above precursors, methods, polymers, films, and integrated circuit chips are within the scope of the invention, and are considered to be part of the invention. Other features, aspects and objects of the invention can be obtained from a review of the figures and the claims. All references cited herein are hereby incorporated fully by reference.

It is to be understood that the invention does not rely upon any particular theory of operability. Further, other embodiments of the invention can be developed and fall within the spirit and scope of the invention and claims.

Incorporation of Reference

Each of the references cited above in this application is herein incorporated fully by reference.

INDUSTRIAL APPLICABILITY

This invention includes novel precursors and methods for making poly(para-xylylenes), fluorinated poly(para-xylylenes), poly(para-fluoro xylylenes), fluorinated poly (para-fluoro xylylenes), and cross-linked polymers made with the above precursors.

This invention also includes thin films and integrated circuits made using the novel precursors and methods.

What is claimed is:

1. A polymer comprising a poly(para-xylylene) made according to the steps of:
   (a) selecting as starting materials a fluorinating agent and a compound having the following structure:

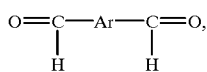

wherein Ar is a phenylene moiety comprising at least one fluorine atom comprising an $sp^2$C—F bond;
   (b) processing the starting materials to produce a tetrafluoro precursor;
   (c) further processing the precursor with one of a TP and CVD process to produce a reactive intermediate compound; and
   (d) polymerizing the reactive intermediate compound into the fluorinated poly(para-xylylene), wherein said phenylene moiety comprises at least one $sp^2$C—F bond.

2. The polymer of claim 1, wherein the precursor is $YF_2C$—Ar—$CF_2Y$, and Y is a leaving group.

3. The polymer of claim 1, wherein the fluorinating agent is $SF_4$ and the starting materials are reacted in a pressurized reactor at from about 1 MPas to about 20 MPas and at temperatures ranging from about 100° C. to about 200° C.

4. The polymer of claim 1, wherein the TP and CVD processes uses one of a resistive heating and an IR processing device.

5. The polymer of claim 1, wherein step (c) is selected from the group consisting of a thermal deposition process, a plasma enhanced deposition process, and photon assisted deposition processes.

6. The polymer of claim 2, wherein step (c) includes breaking the C—Y bonds while maintaining the $sp^2$C—F bonds in order to produce the reactive intermediate compound.

7. The polymer of claim 1, wherein step (c) is a photolytic process using photons provided by one of UV and VUV sources.

8. The polymer of claim 5, wherein the photolytic process uses photon sources derived from incoherent excimer radiation.

9. The polymer of claim 8, wherein the incoherent excimer radiation is derived from dielectric barrier discharge.

10. The polymer of claim 8, wherein photons generated by dielectric discharge have an energy in the range of about 2 eV to about 15 eV.

11. The polymer of claim 8, wherein photons generated by dielectric discharge have an energy in the range of about 3 to 4 eV.

12. The polymer of claim 1, wherein step (c) includes a combination of both thermolytic and photolytic reactions.

13. The polymer of claim 1, wherein step (b) produces a tetrafluoro precursor in solution.

14. The polymer of claim 1, wherein step (c) employs a catalyst in a thermolytic process.

15. The polymer of claim 1, wherein step (c) is a thermolytic process using a furnace.

16. The polymer of claim 1, wherein step (c) is a thermolytic process using a rapid thermal processing system.

17. The polymer of claim 16, wherein the rapid thermal processing system utilizes infrared radiation.

18. The polymer of claim 1, wherein step (c) employs a free radical initiator.

19. The polymer of claim 18, wherein the free radical initiator is a halogen.

20. The polymer of claim 18, wherein the free radical initiator is selected from the group consisting of $Br_2$ and $I_2$.

21. The polymer of claim 1, wherein Y is H.

22. A polymer comprising a poly(para-xylylene) made according to the steps of:
   (a) selecting a tetrafluoro compound as precursor, wherein the tetrafluoro compound comprises a phenylene moiety and contains at least one fluorine atom comprising an $sp^2$C—F bond;
   (b) processing the precursor with one of a TP and a CVD process; and
   (c) polymerizing the reactive intermediate compound into the fluorinated poly(para-xylylene),
wherein said phenylene moiety comprises at least one $sp^2$ C—F bond.

23. The polymer of claim 22, wherein step (b) includes splitting the precursor to form a reactive intermediate compound.

24. A polymer comprising a poly(para-xylylene) made according to the steps of:
   (a) selecting as a precursor, a tetrafluoro derivative of a phenylene moiety comprising at least one fluorine atom comprising an $sp^2$C—F bond;
   (b) processing the tetrafluoro derivative with one of a thermolytic process, a plasma enhanced process, or a photolytic process to produce a reactive intermediate compound; and
   (c) polymerizing the reactive intermediate compound into a polymer, wherein said phenylene moiety comprises at least one $sp^2$ C—F bond.

25. A cross-linked polymer comprising a poly(para-xylylene) made according to the steps of:
   (a) selecting a precursor with the chemical structure:

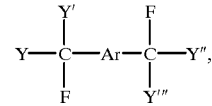

wherein Ar is a phenylene moiety containing at least one fluorine atom comprising at least one $sp^2$ C—F bond, wherein Y, Y', Y", and Y'" are leaving groups independently selected from the group consisting of —H, —SR, —$NR_3$, —$SR_3$, —$CR_3$, —OR, —$SO_2R$, —Cl, —Br, and —I and wherein R groups are selected from the group consisting of H, alkyl, and aromatic moieties;
   (b) processing the precursor to produce at least a tri-functional reactive intermediate compound; and
   (c) polymerizing the tri-functional reactive intermediate compound into a polymer, wherein said phenylene moiety comprises at least one $sp^2$ C—F bond.

26. The polymer of claim 25, wherein step (b) comprises a TP and a CVD process.

27. The polymer of claim 26, wherein the TP and CVD processes comprise one of a thermolytic deposition process, a plasma enhanced deposition process, and a photolytic deposition process.

28. A cross-linked polymer comprising a poly(para-xylylene) made according to the steps of:
(a) selecting a first precursor comprising: FYY'C—Ar—CY"Y'"F wherein Ar is a phenylene moiety comprising at least one fluorine atom having an $sp^2$ C—F bond; wherein Y, Y', Y" and Y'" are leaving groups selected independently from the group consisting of —H, —SR, —NR$_3$, —SO$_2$R, —SiR$_3$, —CR$_3$, —OR, —Cl, —Br, and —I, and wherein R groups are selected from the group consisting of H, alkyl, and aromatic moieties;
(b) selecting a second precursor comprising: YH$_{2-n}$F$_n$—C—Ar—CYH$_{2-m}$F$_m$, wherein Ar is a phenylene moiety comprising at least one fluorine atom having an $sp^2$ C—F bond; Y is a leaving group and n and m are 0, 1, or 2;
(c) mixing desired amounts of the first and second precursors; the desired amounts selected to optimize the amount of cross-linking between polymers;
(d) processing the precursors to produce reactive intermediate compounds with one of a TP and a CVD process; and
(e) polymerizing the reactive intermediate compounds into a polymer, wherein said phenylene moiety comprises at least one $sp^2$ C—F bond.

29. The polymer of claim 28 wherein the TP and CVD processes are selected from the group consisting of a thermal deposition process, a plasma enhanced deposition process, and a photolytic deposition process.

30. A cross-linked polymer comprising a poly(para-xylylene) made according to the steps of:
(a) selecting as starting materials a fluorinating agent and a compound having the following structure:

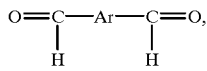

wherein A is a phenylene moiety comprising at least one fluorine atom having an $sp^2$ C—F bond;
(b) processing the starting materials to produce a tetrafluoro compound precursor;
(c) further processing the precursor with one of a TP and CVD process to produce a reactive intermediate compound;
(d) polymerizing the reactive intermediate compound to form a polymer, wherein said phenylene moiety comprises at least one $sp^2$ C—F bond;
(e) exposing he polymer to an energy source sufficient to produce reactive intermediate groups within the polymer; and
(f) permitting the reactive intermediates of adjacent polymers to bond with each other.

31. The cross-linked polymer of claim 30, wherein the TP and CVD processes are selected from the group consisting of a thermolytic deposition process, a plasma enhanced deposition process, and a photolytic deposition process to produce a reactive intermediate compound.

32. A polymer comprising a poly(para-xylylene) made according to the steps of:
(a) selecting a precursor for a poly(para-xylylene), said precursor comprising a phenylene moiety having at least one fluorine atom having an $sp^2$C—F bond;
(b) injecting the precursor into one of a TP and a CVD apparatus;
(c) cracking the precursor to form a reactive intermediate;
(d) depositing the reactive intermediate on a substrate;
(e) permitting the reactive intermediate to polymerize on the substrate to form a polymer, wherein said phenylene moiety comprises at least one $sp^2$ C—F bond;
(f) exposing the polymer to an energy source sufficient to generate reactive intermediates within the polymer; and
(g) permitting the reactive intermediates to re-polymerize.

* * * * *